United States Patent

Kurisu et al.

[11] Patent Number: 5,167,996
[45] Date of Patent: Dec. 1, 1992

[54] INFORMATION RECORDING MEDIA

[75] Inventors: Masayoshi Kurisu, Kitmitsu; Suguru Tokita, Kuga, both of Japan

[73] Assignee: Mitsui Petrochemical Industries, Ltd., Tokyo, Japan

[21] Appl. No.: 618,605

[22] Filed: Nov. 27, 1990

[30] Foreign Application Priority Data

Nov. 27, 1989 [JP] Japan .................. 1-307147

[51] Int. Cl.$^5$ .............................. B32B 3/00
[52] U.S. Cl. ................................ 428/64; 428/65; 428/913; 346/76 L; 346/135.1; 430/945; 369/282; 369/283; 369/288
[58] Field of Search ............. 428/64, 65, 913; 369/282, 283, 288; 346/76 L, 135.1

[56] References Cited

U.S. PATENT DOCUMENTS

| | | |
|---|---|---|
| 4,230,814 | 10/1980 | Crivello .................. 522/68 |
| 4,903,224 | 2/1990 | Namiki et al. .......... 369/282 |
| 4,944,982 | 7/1990 | Kikuchi .................. 428/65 |

Primary Examiner—B. Hamilton Hess
Assistant Examiner—Elizabeth Evans
Attorney, Agent, or Firm—Sherman and Shalloway

[57] ABSTRACT

Improvement in an information recording medium comprising two transparent resin substrates combined with each other, at least one of which has a recording layer provided on the inner surface thereof, two hubs mounted over the center hole of said disc substrates on both sides thereof, each hub having a insertion portion to be inserted into said center hole and a flange portion to cover a portion of said disc substrate in the vicinity of said center hole, wherein a notch is provided on the peripheral surface of each hub, adhesive layers are formed at least in the notch, between the inner peripheral surface of the center hole and the outer peripheral surface of the insertion portion of said hubs and between the hubs and a specific photo-curable composition may be used for the adhesive layer.

9 Claims, 4 Drawing Sheets

INFORMATION RECORDING MEDIA

FIELD OF THE INVENTION

This invention relates to information recording media used for optical recording discs and the like.

BACKGROUND OF THE INVENTION

Information recording media made of plastics to perform storing and reading of information by converging rays of light such as laser beam and the like on recording layer are required to have service durability under severe conditions such as temperature and moisture cycle for long-term period. With view of meeting such requirement as mentioned above, there have been proposed information recording media reinforced by forming layers of cured resin (adhesive) on the edge surfaces of center holes of the disc substrates (Japanese Patent Laid-open Publin. No. 175046/1984). However, there were involved such problems that the recording media were weak in mechanical resistance to driving force from the inner peripheral portion and tend to come away from each other, starting from the inner peripheral side thereof, though the structure thereof was effective in resistance to the temperature and moisture cycle to which they are exposed.

Furthermore, there have been proposed information recording media in which the peripheral portion of the center hole of the laminated disc substrates are provided with holes annually perforated, cage-like connection rods are inserted into the holes thus perforated, and metallic suction caps are fixed to both the upper and lower parts of the connecting rods thus inserted (Japanese Patent Laid-open Publin. No. 119747/1987). However the information recording media are much complicated in structure, require perforating operation when the laminated disc substrates are assembled and involve difficulty in operation of assembling.

OBJECT OF THE INVENTION

The present invention is intended to solve such various problems associated with the prior art as mentioned above, and an object of the invention is to provide information recording media having the laminated structure easy to manufacture and capable of obtaining high adhesion strength of the information recording media (the adhered part of inner peripheral portion of the media such as between the disc substrates and hubs; and between two hubs). Another object of the invention is to provide information recording media having said structure and an adhesive layer which is cured immediately and has excellent adhesion strength in the beginning of curing and in humid condition.

SUMMARY OF THE INVENTION

The first information recording media according to the present invention comprise two transparent resin substrates combined with each other, at least one of which has a recording layer provided on the inner surface thereof, two pieces of hubs mounted over the center hole of said disc substrates on both sides thereof, each hub having a portion to be inserted into said center hole and a flange portion to cover a portion of said disc substrate in the vicinity of said center hole, a notch provided on the peripheral surface of said hubs, and adhesive layers formed in said notch, between the flange portion of said hubs and the said disc substrate, between the outer peripheral surface of the insertion portion of said hubs and the inner peripheral surface of the center hole of said disc substrates, and between the hubs.

The second information recording media according to the present invention comprise two transparent resin substrates combined with each other, at least one of which has a recording layer provided on the inner surface thereof, two pieces of hubs mounted over the center hole of said disc substrates on both sides thereof, each hub having a portion to be inserted into said center hole and a flange portion to cover a portion of said disc substrate in the vicinity of said center hole, a notch provided on the peripheral surface of said hubs, and adhesive layers formed in the notch, between the inner surface of the center hole and the outer surface of the inserted portion of the hubs, and between two hubs, wherein said adhesive is a photo-curable composition comprises (A) an epoxy resin,
(B) a compound selected from the group consisting of sulfonium salts and cyclopentadienyl iron compounds,
(C) a compound selected from the group consisting of acrylates, metacrylates and olygomers thereof, and
(D) an organic peroxide.

DETAILED DESCRIPTION OF THE INVENTION

The present invention is illustrated below with reference to embodiment as expressed in terms of figures shown in the accompanying drawings.

Figure 1:
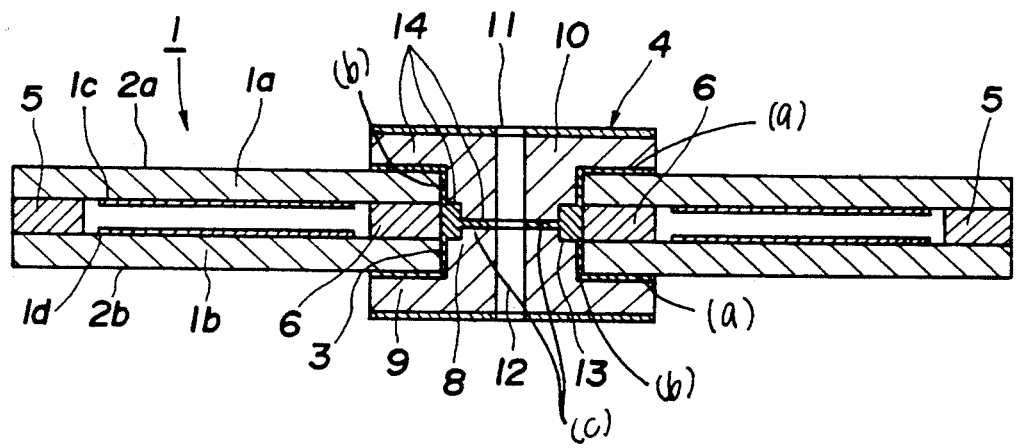
FIGS. 1 and 2 are sectional views of the embodiments according to the first information recording media of the present invention.
Figure 2:
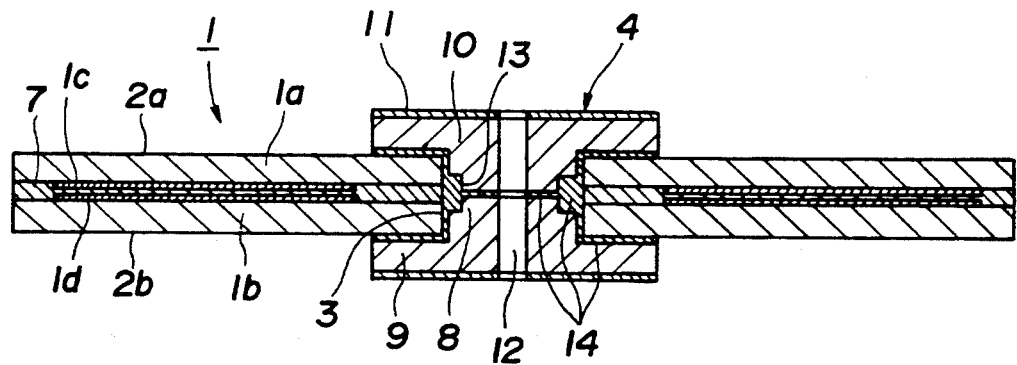
Figure 3:
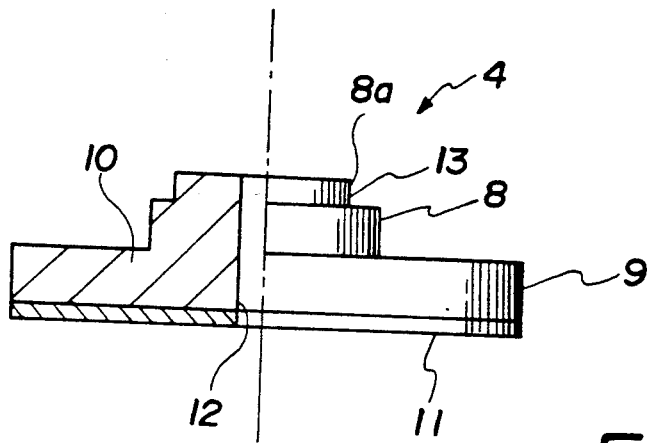
FIGS. 3 to 8 are partially sectioned side views of the hubs used in the present invention.

FIGS. 1 and 2 are sectional views showing separate embodiments of the first information recording media of the present invention respectively and FIG. 3 is partially sectioned side view of the hubs used in the present invention. In figures, 1 is an information recording media of a structure wherein the hubs 4 are fitted in a center hole of two disc substrates 2a and 2b being laminated so that recording layers 1c and 1d provided on the inner surface of the substrates. In FIG. 1, the disc substrates 2a and 2b are superposed upon each other via an outer peripheral spacer 5 and an inner peripheral spacer 6 and laminated by the ultrasonic welding technique or by adhesive to an air sandwich structure, whereas in FIG. 2 said disc substrates 2a and 2b are directly laminated with an adhesive layer 7. The hubs 4 each comprise a main body 10 made of plastics and having a insertion portion 8 to be inserted into the center hole 3 and a flange portion 9, a metallic plate 11 being fixed to the surface of the main body 10, and a hole 12 perforamated at the center thereof. The metallic plate 11 is anchored to the hub main body 10 by means of cut and raised points of projections formed on said metallic plate 11 and the information recording media 1 is so designed as to be driven by mechanical or magnetic force (detailed diagrammatic illustration in this respect is omitted). The insertion portions 8 of the hubs 4 are so designed to be inserted into the center hole 3, and the flange portions 9 of the hubs 4 are so designed to cover the laminated disc substrates 2a and 2b in the vicinity of the center hole 3. Further, the insertion portion 8 to be insert has a notch 13 at the end of the peripheral surface thereof in order to store adhesive.

In the embodiment, as shown in FIG. 3, the notch 13 is ring-shaped and make the portion 8 have a end part having smaller diameter than the other part thereof. The notches 13 of two hubs 4 compose, when the hubs 4 are fitted in the center hole 3, a ring-shaped channel of rectangular cross section formed at the peripheral surfaces of the hubs 4.

Figure 4:
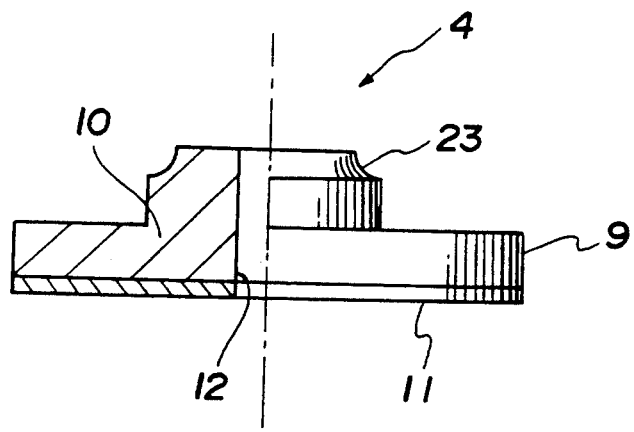

However, in the present invention, the notch to store adhesive may have any shapes suitable for storing adhesive such as shown in FIGS. 4 to 8. FIGS. 4 to 8 are partially sectioned side views of the hubs used in the present invention. For example, as shown in FIG. 4, the notch 23 at the end of the insertion portion 8 is formed circumferentially so as to be ring-shaped and the notches 23 of two hubs 4 compose, when the hubs 4 are fitted in the center hole 3, a ring-shaped channel of U-shaped cross section formed at the peripheral surfaces of the hubs 4.

Figure 5:
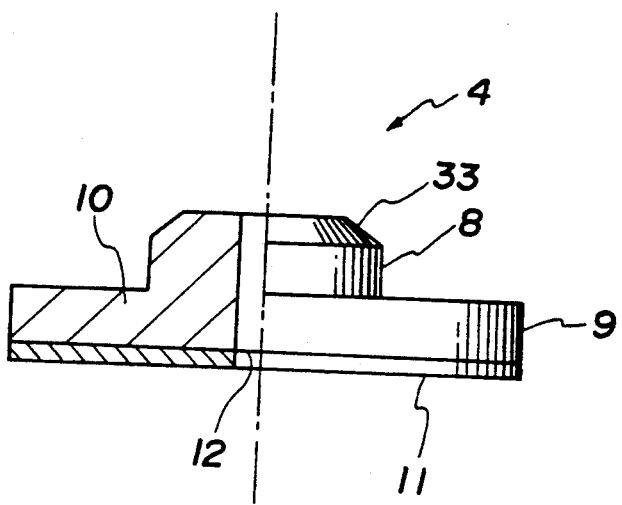

As shown in FIG. 5, the notch 33 formed at the end of the insertion portion 8 is ring-shaped and make the end of the insertion portion 8 tapered and the notches 33 of two hubs compose, when the hubs 4 are fitted in the center hole 3, a ring-shaped channel of V-shaped cross section formed at the peripheral surfaces of the hubs 4.

Figure 6:
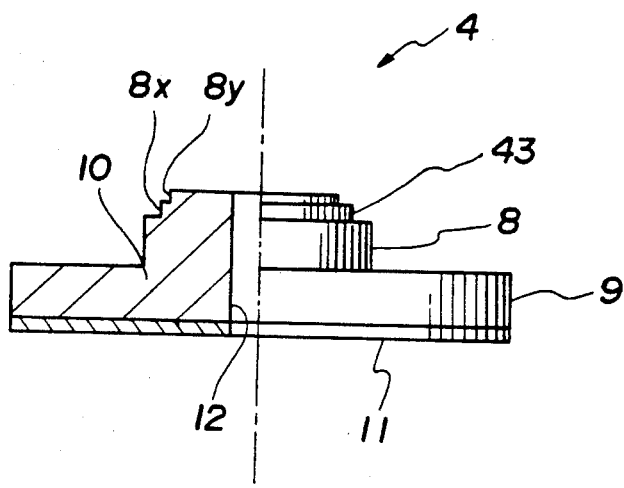

In shown in FIG. 6, the notch 43 formed at the end of the insertion portion 8 is ring-shaped and make the end of the insertion portion 8 have the first and second parts 8x, 8y having smaller diameter than the other part. The notches 43 of two hubs 4 compose, when the hubs 4 are fitted in the center hole 3, a ring-shaped channel of ⌊⌋ -shaped cross section formed at the peripheral surfaces of the hubs 4.

Figure 7:
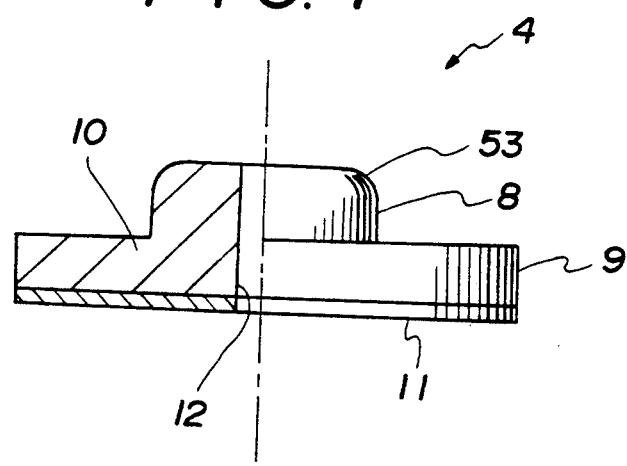

In FIG. 7, the notch 53 formed at the end of the portion 8 is ring-shaped and make the end of the portion 8 have a radius and the notches 53 of two hubs compose, when the hubs 4 are fitted in the center hole 3, a ring-shaped channel of r-shaped cross section formed at the peripheral surfaces of the hubs 4.

Figure 8:
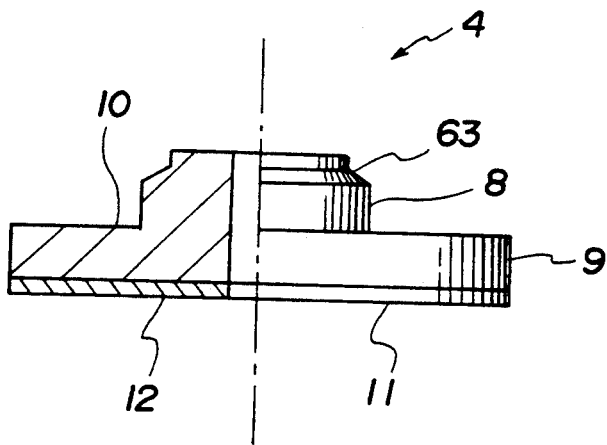

In FIG. 8, the notch 63 is ring-shaped and make the end of the portion 8 composed of a tapered part 8b and a part 8c having smaller diameter than the other part thereof. The notches 13 of two hubs 4 compose, when the hubs 4 are fitted in the center hole 3, a ring-shaped channel of trapezoidal cross section formed at the peripheral surfaces of the portion 8.

Figure 9:
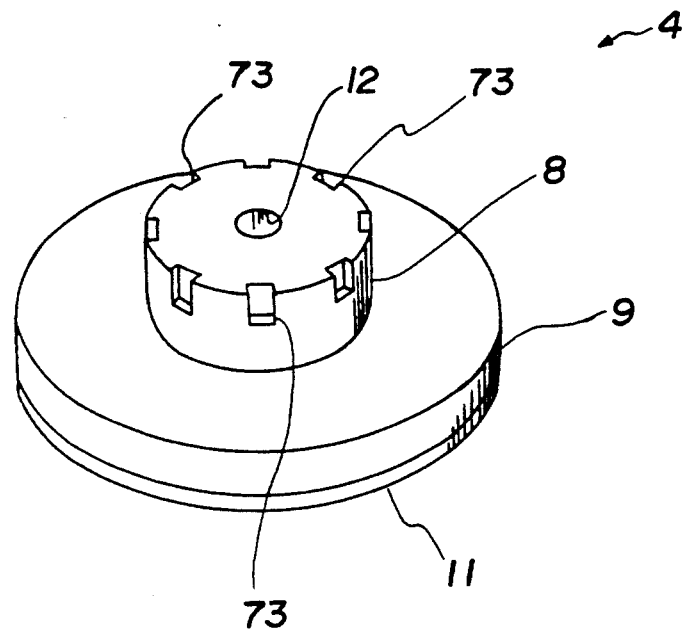
FIG. 9 is a perspective view of the hubs used in the present invention.

Furthermore, in the present invention, the notch 53 formed at the insertion portion 8 of hubs 4 may not be ring-shaped, and may have such shape shown in FIG. 9. Namely, FIG. 9 is a perspective view of another hub used in the present invention, As shown in FIG. 9, at the end of the hub 4, a plurality of circumferential notches 73 formed at regular intervals. The notches 73 of two hubs 4 compose, when the hubs 4 are fitted in the center hole 3, a plurality of recesses formed at regular intervals at the peripheral surfaces of the hubs 4.

In the present invention, the materials used for the transparent resin substrates 2a, 2b, the outer spacer 5, the inner spacer 6 and hubs 4, that compose the disc substrate, include thermoplastic resins such as polycarbonates, polymethyl methacrylates and amorphous polyolefins. The preferably used resins include a cycloolefin random copolymer (i) of ethylene and a cycloolefin represented by the following general formula [I], a ring opening polymer (ii) resulting from ring opening polymerization of the cycloolefin monomers [I] or a hydrogenated polymer resulting from the hydrogenation of said ring opening polymer (ii).

General formula

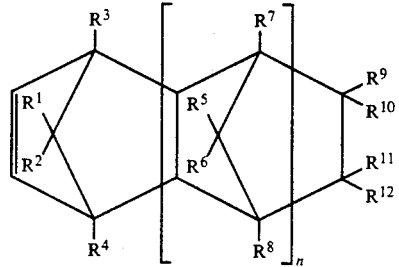

[I]

wherein $R^1$ to $R^{12}$ each represents a hydrogen atom, a halogen atom or a hydrocarbon group, and are the same or different provided that $R^9$ and $R^{10}$, or $R^{11}$ and $R^{12}$, when taken together, may form a divalent hydrocarbon group, $R^9$ or $R^{10}$ and $R^{11}$ or $R^{12}$, when taken together, may form a hydrocarbon ring, and n is 0 or a positive integer and, when n is not less than 2, a plurality of $R^5$ to $R^8$ may be the same or different.

The cycloolefin which is a constituent component of the above-mentioned cycloolefin random copolymers (i) is at least one cycloolefin selected from unsaturated monomers represented by the general formula [I].

In the above-mentioned cycloolefin random copolymers (i), their cycloolefin component has a structure represented by general formula [II].

General formula

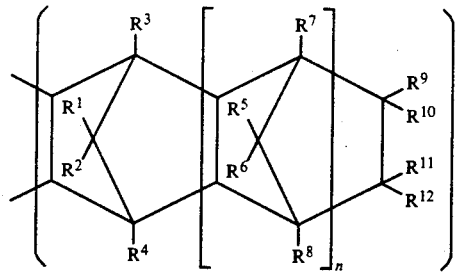

[II].

wherein n and $R^1$ to $R^{12}$ are the same as defined above.

In the above general formula [I], $R^1$ to $R^8$ include a hydrogen atom; a halogen atom such as fluorine, chlorine and bromine; a low alkyle group such as methyl, ethyl, propyl and buthyl and each of $R^1$ to $R^8$ may be different, different in part or the same.

In the above general formula [I], $R^9$ to $R^{12}$ include a hydrogen atom; a halogen atom such as fluorine, chlorine and bromine; a alkyle group such as methyl, ethyl, propyl, iso-propyl, butyl, isobutyl, hexyl, stearyl; a cycloalkyl group such as cyclohexyl. Further, $R^9$ and $R^{10}$, or $R^{11}$ and $R^{12}$, when taken together, may form a divalent hydrocarbon group, and $R^9$ or $R^{10}$ and $R^{11}$ or $R^{12}$, when taken together, may form a hydrocarbon ring.

The divalent hydrocarbon group, formed by taking $R^9$ and $R^{10}$, or $R^{11}$ and $R^{12}$ together, includes alkylidene groups such as ethylidene, propylidene and iso-propylidene.

The hydrocarbon ring, formed by taking $R^9$ or $R^{10}$ and $R^{11}$ or $R^{12}$ together may be a mono-cyclic hydrocarbon ring; a poly-cyclic hydrocarbon ring having a fused ring or a linkage; a cyclic hydrocarbon ring having unsaturated bonding; or the combination thereo f. The rings described above are such rings as exemplified below.

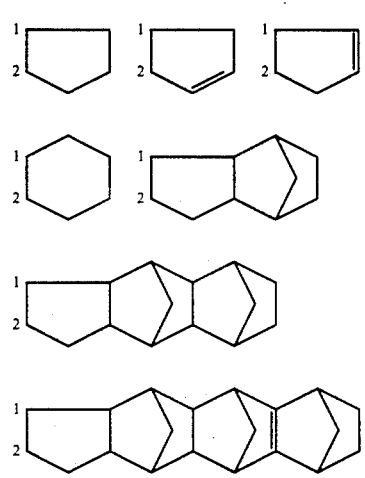

These rings may have a substituent such as methyl. In these formulas illustrated above, carbon atoms denoted by 1 and 2 represent the carbon atoms in the formula [I] which are bonded to $R^9$ to $R^{12}$.

The cycloolefins represented by the general formula [I] may easily be prepared by condensation reaction of cyclopentadienes with appropriate olefins or cycloolefins by Diels-Alder reaction.

The cycloolefins represented by the general formula [I] include concretely:

bicyclo[2.2.1]hept-2-ene and the derivatives thereof,
tetracyclo[4.4.0.1$^{2.5}$.1$^{7.10}$]-3-dodecene and the derivatives thereof,
hexacyclo[6.6.1.1$^{3.6}$.1$^{10.13}$.0$^{2.7}$.0$^{9.14}$]-4-heptadecene and the derivatives thereof,
octacyclo[8.8.0.1$^{2.9}$.1$^{4.7}$.1$^{11.18}$.1$^{13.16}$.0$^{3.8}$.0$^{12.17}$]-5-docosene and the derivatives thereof,
pentacyclo[6.6.1.1$^{3.6}$.0$^{2.7}$.0$^{9.14}$]-4-hexadecene and the derivatives thereof,
pentacyclo[6.5.1.1$^{3.6}$.0$^{2.7}$.0$^{9.13}$]-4-pentadecene and the derivatives thereof,
heptacyclo[8.7.0.1$^{2.9}$.1$^{4.7}$.1$^{11.17}$.0$^{3.8}$.0$^{12.16}$]-5-eicosene and the derivatives thereof,
heptacyclo[8.8.0.1$^{2.9}$.1$^{4.7}$.1$^{11.18}$.0$^{3.8}$.0$^{12.17}$]-5-heneicosene and the derivatives thereof,
tricyclo[4.3.0.1$^{2.5}$]-3-decene and the derivatives thereof,
tricyclo[4.4.0.1$^{2.5}$]-3-undecene and the derivatives thereof,
pentacyclo[6.5.1.1$^{3.6}$.0$^{2.7}$.0$^{9.13}$]-4,10-pentadecadiene and the derivatives thereof,
pentacyclo[4.7.0.1$^{2.5}$.0$^{8.13}$.0$^{9.12}$]-3-pentadecene and the derivatives thereof,
heptacyclo[7.8.0.1$^{3.6}$.0$^{2.7}$.1$^{10.17}$.0$^{11.16}$.1$^{12.15}$]-4-eicosene and the derivatives thereof, nonacyclo[9.10.1.1$^{4.7}$.0$^{3.8}$.0$^{2.10}$.0$^{12.21}$.1$^{13.20}$.1$^{14.19}$.1$^{15.18}$]-5-pentacosene and the derivatives thereof, Concrete examples of the above-mentioned compounds are shown below.

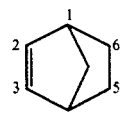

bicyclo[2.2.1]hepto-2-en

6-methylbicyclo[2.2.1]hepto-2-en

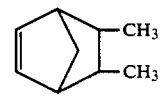

5,6-dimethylbicyclo[2.2.1]hepto-2-en

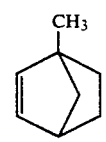

1-methylbicyclo[2.2.1]hepto-2-en

6-ethylbicyclo[2.2.1]hepto-2-en

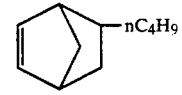

6-butylbicyclo[2.2.1]hepto-2-en

6-i-butylbicyclo[2.2.1]hepto-2-en

7-metylbicyclo[2.2.1]hepto-2-en

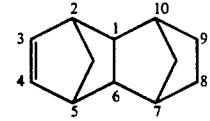

tetracyclo[4.4.0.1$^{2,5}$.1$^{7,10}$]-3-dodecene

8-methyltetracyclo[4.4.0.1$^{2,5}$.1$^{7,10}$]-3-dodecene

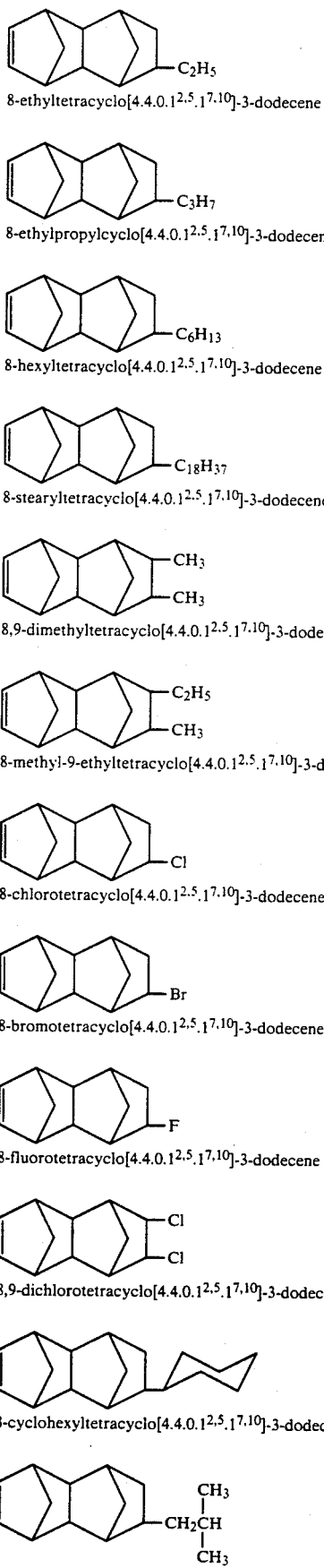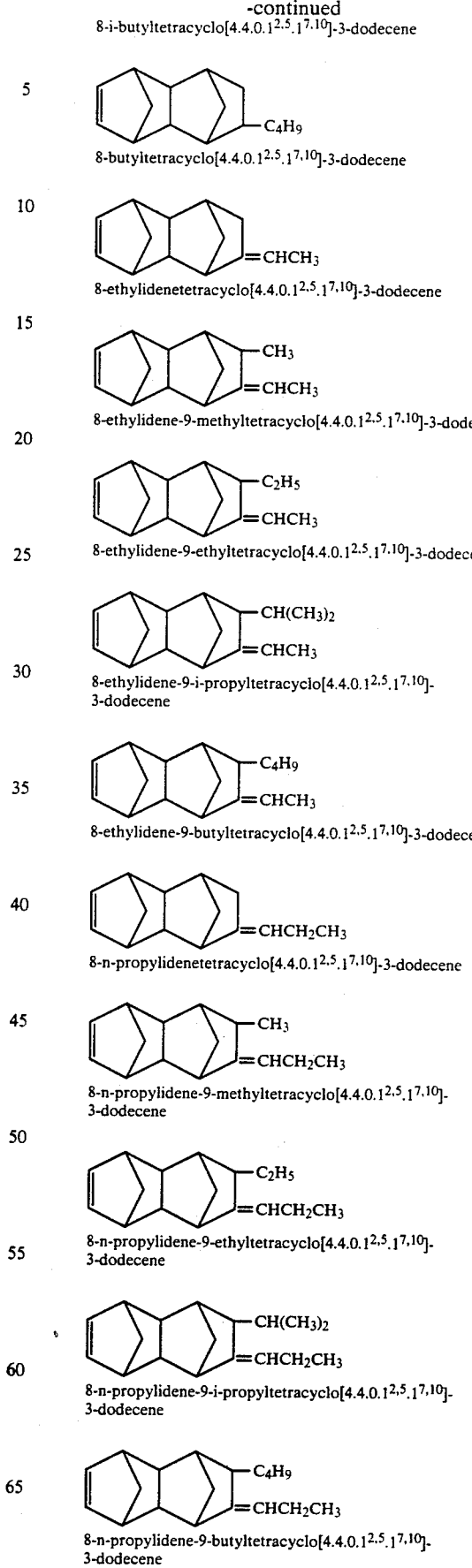

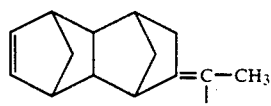
8-i-propylidenetetracyclo[4.4.0.1$^{2,5}$.1$^{7,10}$]-3-dodecene

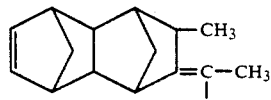
8-i-propylidene-9-methyltetracyclo[4.4.0.1$^{2,5}$.1$^{7,10}$]-3-dodecene

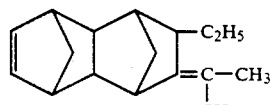
8-i-propylidene-9-ethyltetracyclo[4.4.0.1$^{2,5}$.1$^{7,10}$]-3-dodecene

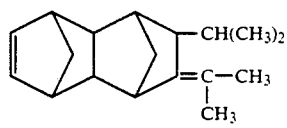
8-i-propylidene-9-i-propyltetracyclo[4.4.0.1$^{2,5}$.1$^{7,10}$]-3-dodecene

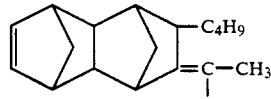
8-i-propylidene-9-buthyltetracyclo[4.4.0.1$^{2,5}$.1$^{7,10}$]-3-dodecene

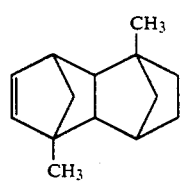
5,10-dimethyltetracyclo[4.4.0.1$^{2,5}$.1$^{7,10}$]-3-dodecene

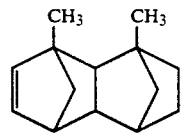
2,10-dimethyltetracyclo[4.4.0.1$^{2,5}$.1$^{7,10}$]-3-dodecene

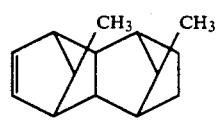
11,12-dimethyltetracyclo[4.4.0.1$^{2,5}$.1$^{7,10}$]-3-dodecene

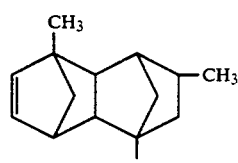
2,7,9-trimethyltetracyclo[4.4.0.1$^{2,5}$.1$^{7,10}$]-3-dodecene

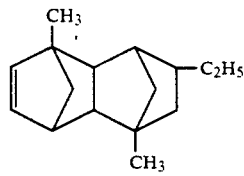
9-ethyl-2,7-dimethyltetracyclo[4.4.0.1$^{2,5}$.1$^{7,10}$]-3-dodecene

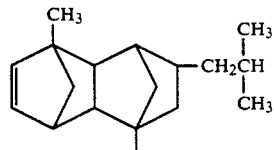
9-i-butyl-2,7-dimethyltetracyclo[4.4.0.1$^{2,5}$.1$^{7,10}$]-3-dodecene

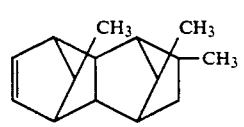
9,11,12-trimethyltetracyclo[4.4.0.1$^{2,5}$.1$^{7,10}$]-3-dodecene

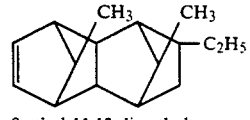
9-ethyl-11,12-dimethyltetracyclo[4.4.0.1$^{2,5}$.1$^{7,10}$]-3-dodecene

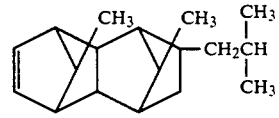
9-i-butyl-11,12-dimethyltetracyclo[4.4.0.1$^{2,5}$.1$^{7,10}$]-3-dodecene

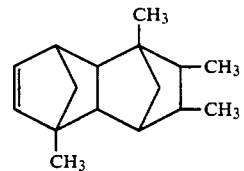
5,8,9,10-tetramethyltetracyclo[4.4.0.1$^{2,5}$.1$^{7,10}$]-3-dodecene

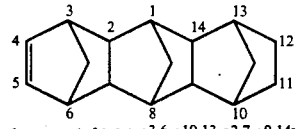
hexacyclo[6.6.1.1$^{3,6}$.1$^{10,13}$.0$^{2,7}$.0$^{9,14}$]-4-heptadecene

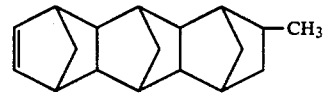
12-methylhexacyclo[6.6.1.1$^{3,6}$.1$^{10,13}$.0$^{2,7}$.0$^{9,14}$]-4-heptadecene

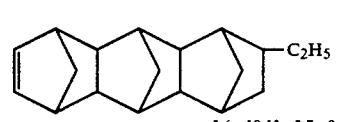
12-ethylhexacyclo[6.6.1.1$^{3,6}$.1$^{10,13}$.0$^{2,7}$.0$^{9,14}$]-4-heptadecene

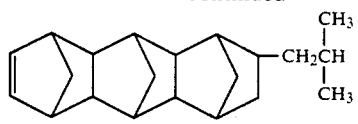
12-i-butylhexacyclo[6.6.1.1³,⁶.1¹⁰,¹³.0²,⁷.0⁹,¹⁴]-4-heptadecene

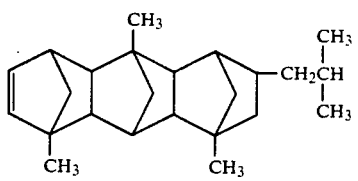
1,6,10-trimethyl-12-i-butylhexacyclo[6.6.1.1³,⁶.1¹⁰,¹³.0²,⁷.0⁹,¹⁴]-4-heptadecene

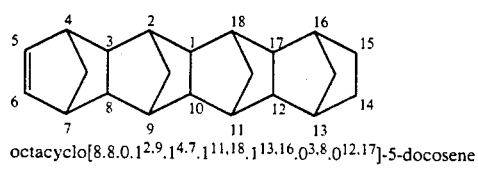
octacyclo[8.8.0.1²,⁹.1⁴,⁷.1¹¹,¹⁸.1¹³,¹⁶.0³,⁸.0¹²,¹⁷]-5-docosene

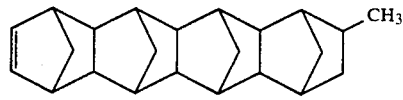
15-methyloctacyclo[8.8.0.1²,⁹.1⁴,⁷.1¹¹,¹⁸.1¹³,¹⁶.0³,⁸.0¹²,¹⁷]-5-docosene

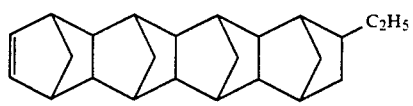
15-ethyloctacyclo[8.8.0.1²,⁹.1⁴,⁷.1¹¹,¹⁸.1¹³,¹⁶.0³,⁸.0¹²,¹⁷]-5-docosene

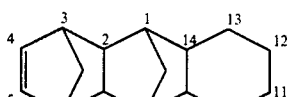
pentacyclo[6.6.1.1³,⁶.0²,⁷.0⁹,¹⁴]-4-hexadecene

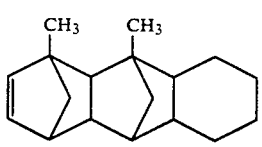
1,3-dimethylpentacyclo[6.6.1.1³,⁶.0²,⁷.0⁹,¹⁴]-4-hexadecene

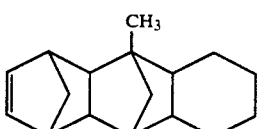
1,6-dimethylpentacyclo[6.6.1.1³,⁶.0²,⁷.0⁹,¹⁴]-4-hexadecene

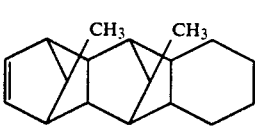
15,16-dimethylpentacyclo[6.6.1.1³,⁶.0²,⁷.0⁹,¹⁴]-4-hexadecene

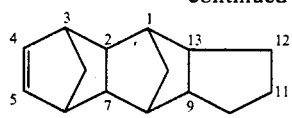
pentacyclo[6.5.1.1³,⁶.0²,⁷.0⁹,¹³]-4-pentadecene

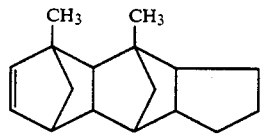
1,3-dimethylpentacyclo[6.5.1.1³,⁶.0²,⁷.0⁹,¹³]-4-pentadecene

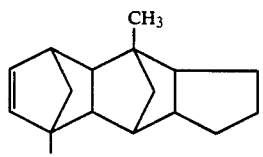
1,6-dimethylpentacyclo[6.5.1.1³,⁶.0²,⁷.0⁹,¹³]-4-pentadecene

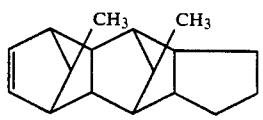
1,6-dimethylpentacyclo[6.5.1.1³,⁶.0²,⁷.0⁹,¹³]-4-pentadecene

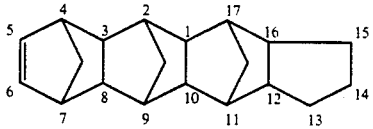
heptacyclo[8.7.0.1²,⁹.1⁴,⁷.1¹¹,¹⁷.0³,⁸.0¹²,¹⁶]-5-eicosene

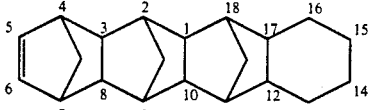
heptacyclo[8.7.0.1²,⁹.1⁴,⁷.1¹¹,¹⁷.0³,⁸.0¹²,¹⁶]-5-eicosene

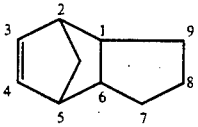
tricyclo[4.3.0.1²,⁵]-3-decene

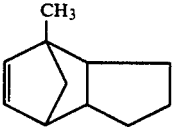
2-methyltricyclo[4.3.0.1²,⁵]-3-decene

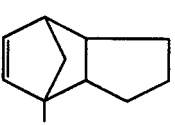
5-methyltricyclo[4.3.0.1²,⁵]-3-decene

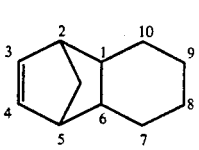

-continued
tricyclo[4.4.0.1²,⁵]-3-undecene

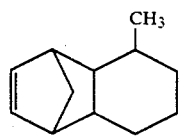

10-metyltricyclo[4.4.0.1²,⁵]-3-undecene

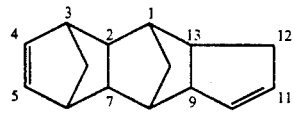

pentacyclo[6.5.1.1³,⁶.0²,⁷.0⁹,¹³]-4,10-pentadecadiene

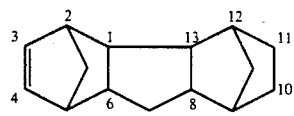

pentacyclo[4.7.0.1²,⁵.1⁹,¹².0⁸,¹³]-3-pentadecene

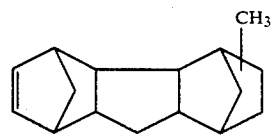

methyl-substituted-pentacyclo[4.7.0.1²,⁵.1⁹,¹².0⁸,¹³]-3-pentadecene

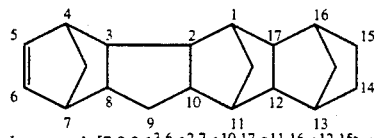

heptacyclo[7.8.0.1³,⁶.1²,⁷.1¹⁰,¹⁷.0¹¹,¹⁶.1¹²,¹⁵]-4-eicosene

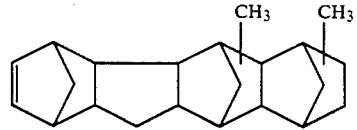

dimethyl-substituted-heptacyclo[7.8.0.1³,⁶.1²,⁷.1¹⁰,¹⁷.0¹¹,¹⁶.1¹²,¹⁵]pentadecene

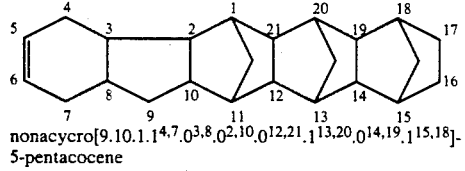

nonacycro[9.10.1.1⁴,⁷.0³,⁸.0²,¹⁰.0¹²,²¹.1¹³,²⁰.0¹⁴,¹⁹.1¹⁵,¹⁸]-5-pentacocene

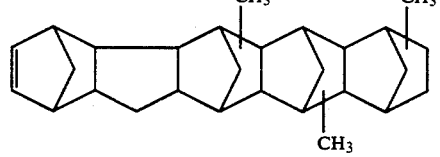

trimethyl-substituted-nonacycro[9.10.1.1⁴,⁷.0³,⁸.0²,¹⁰.0¹²,²¹.1¹³,²⁰.0¹⁴,¹⁹.1¹⁵,¹⁸]-5-pentacocene The cycloolefin random copolymers (i) comprise ethylene units and the above-mentioned cycloolefin units as the essential components as aforesaid, however, if necessary, in addition to these two essential components, said copolymers may contain other copolymerizable unsaturated monomer components so long as they will not throw hinderances in the way of accomplishing the object of the present invention. The unsaturated monomers which may be copolymerized, if necessary, with the copolymers (i) may include, for example, alpha-olefins having from 3 to 20 carbon atoms such as propylene, 1-butene, 4-methyl-1-pentene, 1-hexene, 1-octene, 1-decene, 1-dodecene, 1-tetradecene, 1-hexadecene, 1-octadecene and 1-eicocene which may be used in an amount of up to an equimolar to the ethylene component unit in the resulting random copolymer.

In the cycloolefin random copolymer (i) the recurring units derived from ethylene are present in an amount of from 40 to 85 mol %, preferably from 50 to 75 mol %, while the recurring units derived from the cycloolefin are present in an amount of from 15 to 60 mol %, preferably from 25 to 50 mol %, and these recurring units are arranged at random in the substantially linear chain of the copolymer (i). The fact that this cycloolefin random copolymer [A] is completely soluble in decalin at 135° C. confirms that it is substantially linear and free from a gel-forming crosslinked structure.

The cycloolefin random copolymer (i) has an intrinsic viscosity [η] of from 0.01 to 10 dl/g, preferably from 0.05 to 5 dl/g as measured in decalin at 135° C., a glass transition temperature (Tg) of normally from 50° to 230° C., preferably from 70° to 210° C. and the crystallinity as measured by X-ray diffractometry from 0 to 10%, preferably from 0 to 7%, and further preferably from 0 to 5%.

The cycloolefin random copolymer (i) having the above physical properties may be single copolymer, or the composition obtained by blending 100 parts by weight of a copolymer having an intrinsic viscosity [η] of from 0.01 to 10 dl/g, preferably 0.05 to 10 dl/g and the softening temperature (TMF) of not less than 70° C., preferably from 90° to 250° C. and 0.1 to 10 parts by weight of a copolymer having an intrinsic viscosity [η] of from 0.01 to 5 dl/g and the softening temperature (TMF) of less than 70° C., preferably from −10° to 60° C.

The cycloolefin random copolymers (i) may be prepared by polymerization of ethylene component, cycloolefin component represented by the above-mentioned general formula [I] and, if necessary, other monomers copolymerizable therewith in the presence of known Ziegler type catalyst.

The Ziegler type catalyst referred to above includes, for example, a catalyst (α) composed of a composite material containing at least magnesium, titanium and halogen, and an organoaluminum compound, or a catalyst (β) composed of a vanadium compound and an organoaluminum compound. Of these two catalysts, the latter is preferable than the former, and particularly preferred is a catalyst (β) composed of a soluble vanadium compound and an organoaluminum compound.

The processes for the preparation of the cycloolefin random copolymers (i) are disclosed concretely, for example, in Japanese Patent L-O-P Publin. Nos. 168708/1985, 120816/1986, 115912/1986, 271308/1986, 272216/1986, 252406/1987 and 252407/1987.

Resins used preferably as materials for the transparent resin substrates include a ring opening polymer (ii) resulting from ring opening polymerization of the cycloolefin component represented by the above-mentioned general formula [I] or a hydrogenated product resulting from hydrogenation of said ring opening polymer (ii), adding to said cycloolefin random copolymer (i). Such ring opening polymer of cycloolefin as mentioned above is disclosed, for example, in Japanese Patent L-O-P Publin. No. 26024/1985.

In the ring opening polymer, prior to hydrogenating said polymer to the hydrogenated product, the cycloolefin component represented by the above-mentioned formula [I] is composed mainly of the structural repeating units represented by the following general formula [III] and said cycloolefin component is composed mainly of the structural repeating units represented by the following general formula [IV] the ring opening polymer after the hydrogenation thereof.

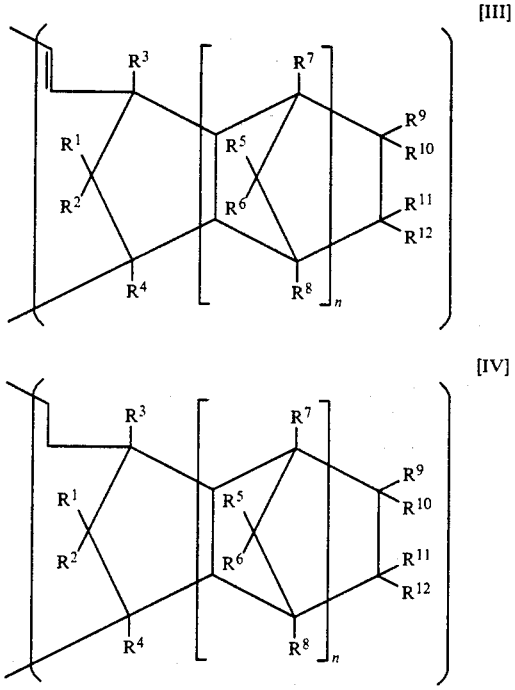

In the above-mentioned formulas, n and R1 to R12 are as defined above.

The ring opening polymer (ii) comprising the above-mentioned cycloolefin component or hydrogenated product thereof (ii) may be copolymers thereof including only those having the physical properties falling within the above-mentioned ranges. In that case, however, parts of the copolymers may be those having values of their physical properties outside the above-mentioned range so long as the values of physical properties of the copolymers, on the whole, fall within the above-mentioned ranges.

The ring opening polymer prior to hydrogenation thereof may be prepared by ordinary ring opening polymerization of cycloolefin using as a starting compound the monomer component selected from among those represented by the above-mentioned general formula [I] and, if necessary, other polymerizable monomer components. Polymerization catalysts used herein include a catalyst system composed of halides, nitrates or acetylacetone compounds, for example, those of ruthenium, rhodium, palladium, osmium, iridium, platinum, molybdenum and tungsten, and reducing agents such as alcohol and tin compounds; or a catalyst system composed of halides or acetylacetone compounds of titanium, vanadium, zirconium, tungsten and molybdenum, and organoaluminum compounds.

The hydrogenated product of the above-mentioned ring opening polymer is obtained by hydrogenation of the ring opening polymer obtained above. The hydrogenation of the ring opening polymer is carried out in the usual way.

Hydrogenation catalysts generally usable herein are those which have been used in hydrogenation of olefin compounds. Concretely speaking, the catalysts of heterogeneous system include nickel, palladium, platinum and the like, or solid catalysts comprising these metals being carried on carriers such as carbon, silica, diatomaceous earth, alumina and titanium oxide, for example, nickel/silica, nickel/diatomaceous earth, palladium/carbon, palladium/silica, palladium/diatomaceous earth, and palladium/alumina. The catalysts of homogeneous system include those comprising metals of Group VIII of the periodic table, those comprising Ni or Co compounds such as nickel naphthenate/triethyl aluminium, nickel octenate/n-butyl lithium and nickel acetylacetonate/triethyl aluminium, and organometallic compounds of metals belonging to Groups I–III of the periodic table, or Rh compounds.

The hydrogenation reaction of the above-mentioned ring opening polymer is carried out in the heterogeneous or homogeneous system, according to the kind of catalyst used at 1 to 150 atom of hydrogen and a temperature range of from 0° to 180° C., preferably from 20° to 100° C. Although the rate of hydrogenation may be regulated according to the hydrogen pressure, reaction temperature, reaction time and concentration of the catalyst used, it is preferable that more than 50%, preferably more than 80% and especially more than 90% of the double bond in the main chain of the polymer is hydrogenated in order that the resulting hydrogenated product exhibits excellent resistance to heat deterioration and resistance to light aging.

These resins as illustrated above may be used either singly or as a blend of two or more resins.

Further, these resins may be formed by common molding techniques such as injection molding into molded products, for example, transparent substrates 1a, 1b or hubs 4 of desired shapes.

A recording layer 1c, 1d used for forming a disc substrate 2a, 2b is composed of a layer of a low-melting metallic material such as Te, a recording material containing a low-melting metallic material as a main component such as Te.C.H, Te.Cr, Te.Cr.H, a heat mode recording material adapted for an information recording medium of the invention such as an organic pigment material or a magnetooptical recording material including a rear earth element and a 3d transition metal such as Tb.Fe.Co and an alloy prepared by adding Pt or Pd to Tb.Fe.Co, and, if necessary, any other layer including a prime coat layer, reflection preventive layer, reflecting layer, interference layer protective layer and enhance layer which is laminated either on one surface or on both surfaces of the recording material layer.

Useful as hubs 4 are those formed, for example, from polycarbonate resin, the above-exemplified cycloolefin random copolymer (i), ring opening polymer of cycloolefin component or hydrogenated product thereof (ii). If necessary, however, there may also be used hubs formed from the above-mentioned resins or fixed coated with a magnetic metal, or those molded from polycarbonate resin, the cycloolefin random copolymer (i), ring opening polymer (ii) of cycloolefin component or hydrogenated product thereof (ii) into which a magnetic material has been incorporated. In the present invention, the hubs formed from polycarbonate resin are particularly useful.

The information recording discs 1 comprising the substrate 1a, 1b, outer spacer 5, inner spacer 6 and hubs 4, or comprising the substrate 1a, 1b and hubs 4, having the above illustrated structure and made of the material described above, are manufactured by laminating the disc substrates 2a and 2b directly with the adhesive layer 7 or by means of the ultrasonic welding technique via the outer peripheral spacer 5 and the inner peripheral spacer 6 so that the recording layers 1c and 1d provided the inner surface of the substrates 2a and 2b, inserting the portions 8 of the hubs 4 into the center hole 3 from both sides thereof, charging the adhesive layers 14 between the disc substrates 2a, 2b and the hubs 4, namely between the discsubstrate 2a, ab and the flange portion (portions denoted by (a)) and between the inner peripheral surface of the center hole 3 of disc substrate 2a, 2b and the outer peripheral surface of the insertion portion 8 of hubs 4 (portion denoted by (b)); and between the hubs 4 (portions denoted by (c)) and notches 13 to anchor them to each other.

In the first information recording media of the present invention, as shown in FIGS. 1 and 2, the adhesive layers 14 are charged in notches 13; between the flange portion 9 of hubs 4 and the disc substrates 2a, 2b; between the outer peripheral surface of insertion portion 8 of hubs 4 and the inner peripheral surface of the center hole 3 of disc substrate 2a, ab and between two hubs 4. In the specification, the phrase "between the disc substrate 2a, 2b and hubs 4" means both of the portion (a) between the disc substrate 2a, 2b and the flange portion 9 of the hubs 4; and portion (b) between the inner peripheral surface of the center hole 3 of disc substrate 2a, 2b and the outer peripheral surface of the insertion portion 8 of hubs 4.

In the information recording discs 1 thus manufactured, since the hubs 4 are bonded with the disc substrates 2a and 2b at the insertion portions 8 and flange portions 9 of said hubs 4 by means of the adhesive layer 14, and the hubs 4 themselves are bonded to each other by means of the adhesive layer 14, all the constituent parts are integrally formed to a solid structure, whereby the inner peripheral portion of the solid structure is reinforced to increase lamination strength thereof.

Since adhesive is stored in the notches 13, the peel strength of the adhesive layer 14 of the first information recording media is increased.

The first information recording media of the present insertion, since the portion between the disc substrate 2a, 2b and the flange portion 9 of hubs 4 are bonded by means of adhesive, have high adhesion strength between the disc substrate 2a, 2b and hubs 4, and have a solid structure compared with the second information recording media of the present invention.

When the adhesive layer 14 is formed between the flange portion 9 of hubs 4 and the disc substrate 2a, 2b, according to the nature of the resin used, the birefrigence of the substrate 2a, 2b is apt to increase. However, in case that the cycloolefin random copolymer (i), the ring opening polymer (ii) or a hydrogenated polymer resulting from the hydrogenation of said ring opening polymer (ii) is used for the materials of the resin substrates 1a, 1b, the increase of the birefrigence is low and dose not become practical problems.

In the first information recording media of the present invention, the material used for the adhesive layer 14 is not limited, and may be the known adhesives which have been used for the manufacture of the information recording media.

Concrete examples of the material used for the information recording media include heat curable adhesives such as amino resin, phenol resin, resorcinol resin, xylene resin, furan resin, epoxy resin, polyisocyanate resin, unsaturated polyester and acrylic resin; thermoplastic adhesives such as vinyl acetate type adhesive, acrylic type adhesive, ethylene type adhesive, polyamide, polyester and polyurethane; rubber type adhesives such as those of polychloroprene type, nitrile rubber type, reclaimed rubber type, SBR type and natural rubber type; pressure-sensitive adhesives such as those of rubber type, acrylic type, emulsion type, oligomer type, hot-melt type, heat curable type and moisture-absorption curable type; hot-melt adhesives such as those of water soluble type, high temperature type, reaction type and pressure-sensitive type; instantaneous adhesives such as that of cyanoacrylate type; and adhesives cured in the anearobic condition. Furthermore, the preferred examples include UV-curable adhesives of acrylate type or epoxy type.

However, in consideration with adhesion in the beginning of manufacturing and in humid condition, it is most preferred that a photo-curable compound comprising the specific ingredient (A)–(D), which is cured by activating energy ray, is used for the adhesive. This adhesive preferably used in the first information recording media of the present invention is illustrated below.

Figure 10:
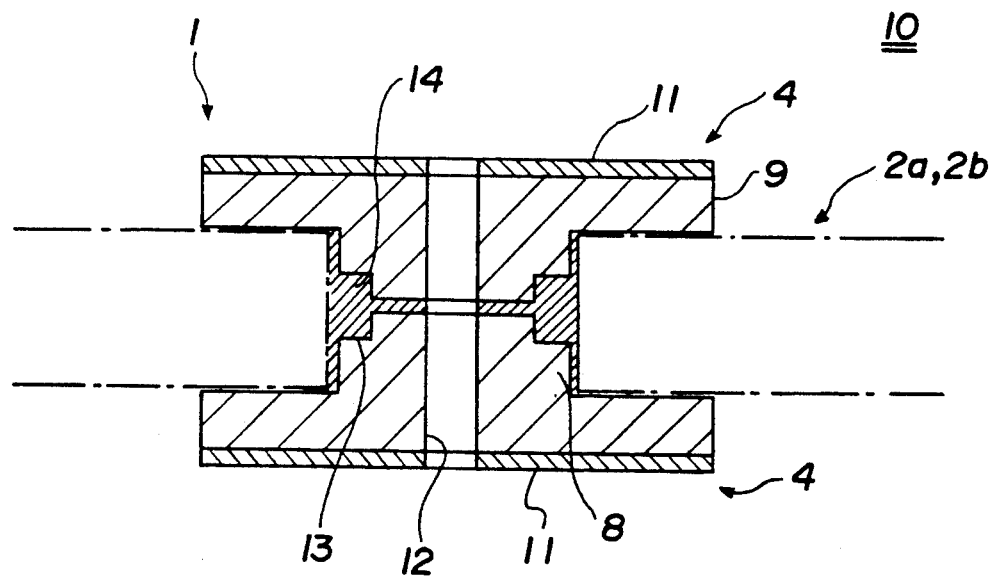
FIG. 10 is an enlarged sectional view of the embodiment according to the second information recording media of the present inventio.

Then, the second information recording media of the present invention is illustrated with reference to FIG. 10. FIGS. 10 is a sectional view showing an embodiment of the information recording disc according to the second information recording media of the present invention. As shown in FIG. 10, the information recording discs 1 comprise the constituent parts as same as those of the first information recording media, and are constructed by filling a space between the inner peripheral surface of the center hole 3 of each of the aforementioned substrates 2a, 2b, and the outer peripheral sueface of the insertion portion 8 of the hub 4, the inside of the notch 13 of each of the hubs 4, and a space between the two hubs 4 with the specific adhesive composition of the present invention and thereby to combine integrally these components with one another.

In the information recording discs 1, since the hubs 4 are in contact with the disc substrates 2a and 2b at the flange portions 9 of said hubs 4, and the hubs 4 themselves are bonded to each other by means of the adhesive layer 14 while the hubs 4 are bonded with the disc substrates 2a and 2b at the insertion portion 8 by means of adhesive layer 14, all the constituent parts are integrally formed to a solid structure, whereby the inner peripheral portion of the solid structure is reinforced to increase lamination strength thereof.

Since adhesive is cured in the condition wherein a part of the adhesive is stored in the notches 13, the peel strength of the adhesive layer 14 is increased.

The adhesive, which is preferably used in the first information recording media and should be used in the second information recording media of the present invention, contains the aforementioned energy photo-curable composition cured by activation energy ray comprises (A) an epoxy resin,
(B) a compound selected from the group consisting of sulfonium salts and cyclopentadienyl iron compounds, (C) a compound selected from the group consisting of acrylates, methacrylates and olygomers thereof, and (D) an organic peroxide.

Preferable as the epoxy resin (A) to be contained in the compositions used as the adhesives of the present invention are, for example, compounds having in the molecule more than two epoxy groups, and particularly preferred are aliphatic or alicyclic epoxy compounds.

Such epoxy resins (B) as mentioned include, for example, a glycidyl ether type epoxy resin of a polyphenol compound such as bisphenol A, bisphenol F and 1,1,2,2-tetrakis(4'-hydroxyphenyl)ethan; a glycidyl ether type epoxy resin of a polyhydric phenol such as catechol, resolcine, hydroquinone and fuloroglucine; a glycidyl ether type epoxy resin of polyhydric alcohol such as ethylene glycol, butanediol, glycerol, erythritol and polyoxyalkylene glycol; a novolak epoxy resin; a cycloolefin type epoxy resin such as vinylcyclohexene dioxid, limonene dioxide and dicyclopentadiene dioxide, ; a polyglycidyl type ester epoxy resin which is an ester condensate of a polycarboxylic acid such as phthalic acid and cyclohexane-1,2-dicarboxylic acid; and polyglycidyl amine epoxy type resin. Of these epoxy resins as exemplified above, preferred are glycidyl ether epoxy type resins of polyphenol compounds or epoxynovolac epoxy resins. Of the glycidyl ether epoxy resins, preferred are glycidyl ether type epoxy resin of bisphenol A or bisphenol F, and particularly preferred are glycidyl ether type epoxy resin of bisphenol A.

The composition used as the adhesive of the present invention contains (B) a compound selected from the group consisting of sulfonium salts and cyclopentadienyl iron compounds. Preferable as the sulfonium salts are triaryl sulfonium salts, and particularly preferred are triphenyl sulfonium salts. Preferable anion of these sulfonium salts is $AsF_6^-$ or $BF_4^-$.

The sulfonium salts include concretely, for example, triphenyl sulfonium salt of the following formula

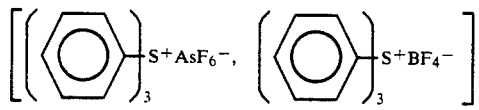

tri-(4-methylphenyl)sulfonium salt of the following formula

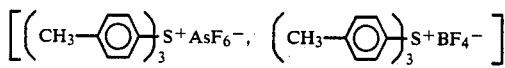

and tri-(4-methoxyphenyl)sulfonium salt of the following formula.

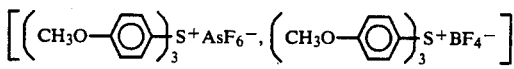

The cyclopentadienyl iron compounds include those having in the molecule two cyclopentadienyl groups, or those having in the molecule one cyclopentadienyl group and one aromatic group such as phenyl or isopropylphenyl. Of these compounds as illustrated above, preferred are those having in the molecule one cyclopentadienyl group and one aromatic group, and particularly preferred are those having in the molecule cyclopentadienyl group and isopropylphenyl group.

Such particularly preferred cyclopentadienyl iron compounds as mentioned above include, for example, cyclopentadienyl isopropylphenyl iron (II) salt of the following formula.

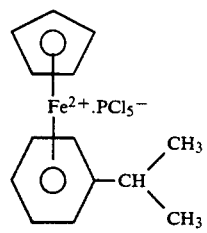

As the compound (B) contained in the composition used as the adhesive composition of the present invention, the sulfonium salts and cyclopentadienyl iron compounds may be used either singly or in combination. Particularly preferable as the compound (B) is the cyclopentadienylisopropylphenyl iron (II) salt represented the above-mentioned formula.

Acrylates or methacrylates as the component (C) contained in the composition used as the adhesive of the present invention are esters of hydroxy compounds or polyhydroxy compounds with acrylic acid or methacrylic acid. Such esters include, for example, those of monovalent aliphatic alcohol of 1 to 20 carbon atoms, alicyclic alcohol of 1 to 30 carbon atoms, divalent aliphatic alcohol of 1 to 20 carbon atoms, divalent alicyclic alcohol of 1 to 20 carbon atoms, trivalent aliphatic alcohol of 1 to 20 carbon atoms and hydroxy compounds such as polyester having a terminal hydroxyl group with acrylic acid or methacrylic acid.

Concrete examples of the component (C) include, for example, methyl acrylate, methyl methacrylate, ethyl acrylate, ethl methacrylate, butyl acrylate, butyl methacrylate; cyclohexyl acrylate, norbolnyl acrylate, dicyclopentanyl acrylate, dicyclopentenyl acrylate, isobornyl acrylate and cyclohexyl methacrylate, and cyclohexyl methacrylate, polyesters represented by the following formula [V] and terminated by acrylic acids,

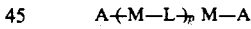  [V]

wherein A is acrylic acid residue, M is divalent aliphatic or alicyclic alcohol residue, L is dibasic acid residue, and p is a positive number, and polyesters represented by the following formula [VI], in which both ends and hydroxyl group in the chain have been blockaded by acrylic acid.

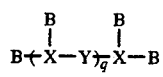  [VI]

wherein B is acrylic acid residue, X is polyhydric aliphatic or alicyclic alcohol residue (exhibiting more than three valences), Y is polybasic acid residue (exhibiting more than two valences), and q is a positive number.

Further examples of the component (C) are as shown below.

Some of these acrylates or methacrylates as exemplified above are disclosed in Japanese Patent L-O-P Publn. No. 136529/1986. These acrylates or methacrylates may be used as oligomers prepared by pre-polymerization according to the method, per se, known.

Of the compounds exemplified above as the component (C), preferred are alkyl esters of acrylic acid or methacrylic acid, the mixtures of compounds of the above-mentioned formula [V] and the compounds of the above-mentioned formula [VI].

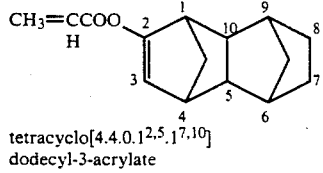

tetracyclo[4.4.0.1$^{2,5}$.1$^{7,10}$]
dodecyl-3-acrylate

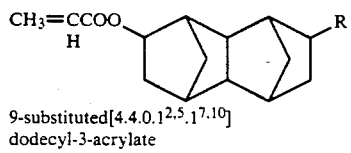

9-substituted[4.4.0.1$^{2,5}$.1$^{7,10}$]
dodecyl-3-acrylate wherein R represents methyl, ethyl, propyl, isobutyl, hexyl, cyclohexyl, stearyl bromo, fluoro, ethylidene, propylidene and isopropylidene.

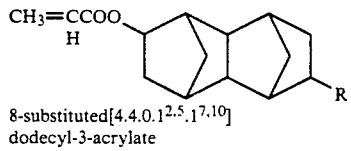

8-substituted[4.4.0.1$^{2,5}$.1$^{7,10}$]
dodecyl-3-acrylate wherein R represents methyl, ethyl, propyl, isobutyl, hexyl, cyclohexyl, stearyl bromo, fluoro, ethylidene, propylidene and isopropylidene.

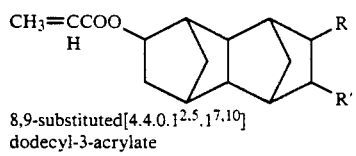

8,9-substituted[4.4.0.1$^{2,5}$.1$^{7,10}$]
dodecyl-3-acrylate wherein R represents methyl, ethyl, propyl, isobutyl, hexyl, cyclohexyl, stearyl bromo, fluoro, ethylidene, propylidene and isopropylidene.

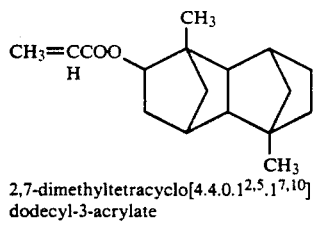

2,7-dimethyltetracyclo[4.4.0.1$^{2,5}$.1$^{7,10}$]
dodecyl-3-acrylate

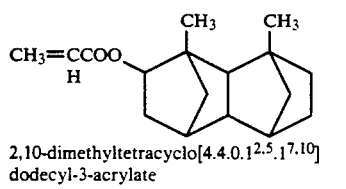

2,10-dimethyltetracyclo[4.4.0.1$^{2,5}$.1$^{7,10}$]
dodecyl-3-acrylate

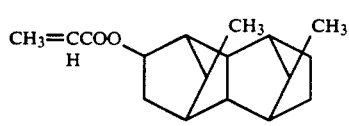

11,12-dimethyltetracyclo[4.4.0.1$^{2,5}$.1$^{7,10}$]
dodecyl-3-acrylate

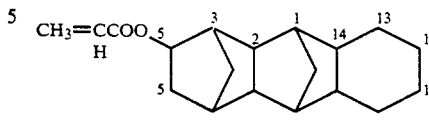

hexacyclo
[6.6.1.1$^{3,6}$.1$^{10,13}$.0$^{2,7}$.0$^{9,14}$]
heptadecyl-4-acrylate

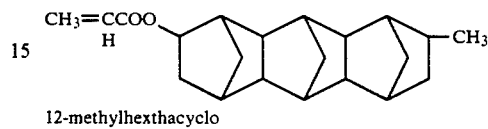

12-methylhexthacyclo
[6.6.1.1$^{3,6}$.1$^{10,13}$.0$^{2,7}$.0$^{9,14}$]
heptadecyl-4-acrylate

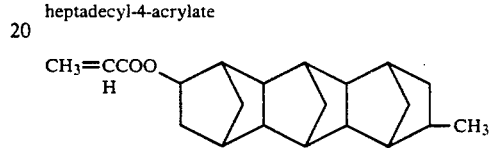

11-methylhexthacyclo
[6.6.1.1$^{3,6}$.1$^{10,13}$.0$^{2,7}$.0$^{9,14}$]
heptadecyl-4-acrylate

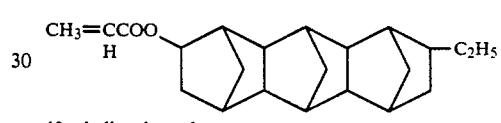

12-ethylhexthacyclo
[6.6.1.1$^{3,6}$.1$^{10,13}$.0$^{2,7}$.0$^{9,14}$]
heptadecyl-4-acrylate

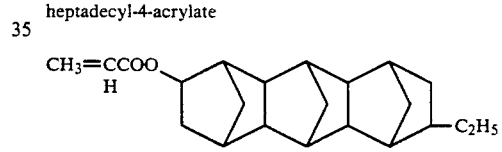

11-ethylhexthacyclo
[6.6.1.1$^{3,6}$.1$^{10,13}$.0$^{2,7}$.0$^{9,14}$]
heptadecyl-4-acrylate

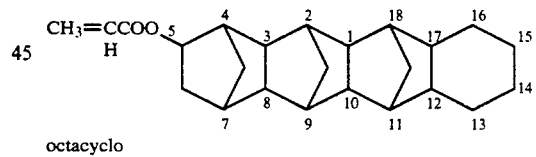

octacyclo
[8.8.0.1$^{2,9}$.1$^{4,7}$.1$^{11,18}$.
1$^{13,16}$.0$^{3,8}$.0$^{12,17}$]
docosyl-5-acrylate CH$_3$=CCOO—[structure]—CH$_3$
H 15-methyloctacyclo
[8.8.0.1$^{2,9}$.1$^{4,7}$.1$^{11,18}$.
1$^{13,16}$.0$^{3,8}$.0$^{12,17}$]
docosyl-5-acrylate CH$_3$=CCOO—[structure]
|
CH$_3$ tetracyclo[4.4.0.1$^{2,5}$.1$^{7,10}$]
dodecyl-3-methacrylate

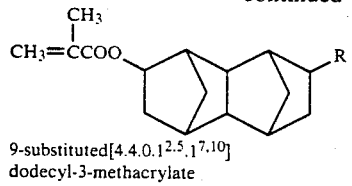

9-substituted[4.4.0.1$^{2,5}$.1$^{7,10}$]
dodecyl-3-methacrylate wherein R represents methyl, ethyl, propyl, isobutyl, hexyl, cyclohexyl, stearyl bromo, fluoro, ethylidene, propylidene and isopropylidene.

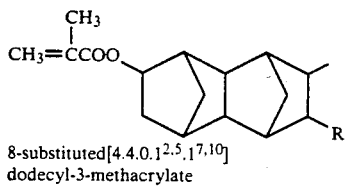

8-substituted[4.4.0.1$^{2,5}$.1$^{7,10}$]
dodecyl-3-methacrylate wherein R represents methyl, ethyl, propyl, isobutyl, hexyl, cyclohexyl, stearyl bromo, fluoro, ethylidene, propylidene and isopropylidene.

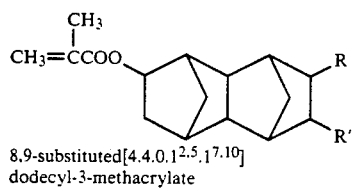

8,9-substituted[4.4.0.1$^{2,5}$.1$^{7,10}$]
dodecyl-3-methacrylate wherein R and R' represents methyl, ethyl, propyl, isobutyl, hexyl, cyclohexyl, stearyl bromo, fluoro, ethylidene, propylidene and isopropylidene.

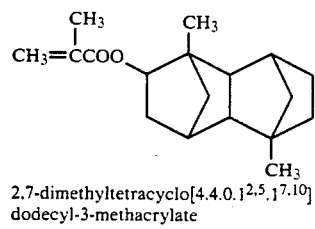

2,7-dimethyltetracyclo[4.4.0.1$^{2,5}$.1$^{7,10}$]
dodecyl-3-methacrylate

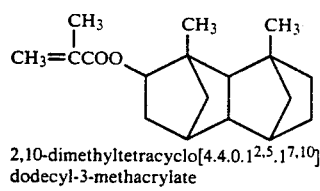

2,10-dimethyltetracyclo[4.4.0.1$^{2,5}$.1$^{7,10}$]
dodecyl-3-methacrylate

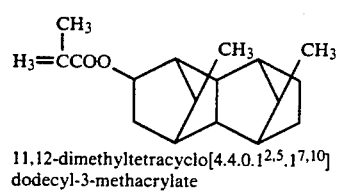

11,12-dimethyltetracyclo[4.4.0.1$^{2,5}$.1$^{7,10}$]
dodecyl-3-methacrylate

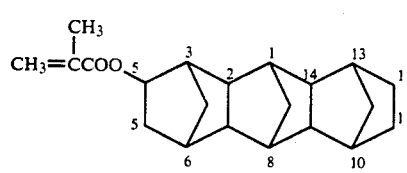

hexacyclo
[6.6.1.1$^{3,6}$.1$^{10,13}$.0$^{2,7}$.0$^{9,14}$]
heptadecyl-4-methacrylate

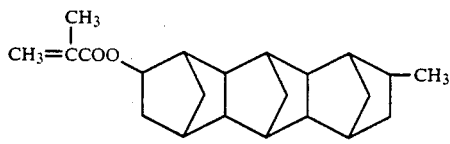

12-methylhexacyclo
[6.6.1.1$^{3,6}$.1$^{10,13}$.0$^{2,7}$.0$^{9,14}$]
heptadecyl-4-methacrylate

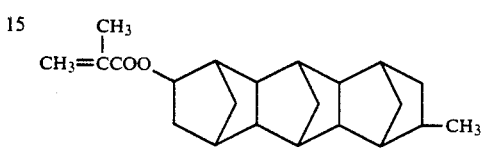

11-methylhexacyclo
[6.6.1.1$^{3,6}$.1$^{10,13}$.0$^{2,7}$.0$^{9,14}$]
heptadecyl-4-methacrylate

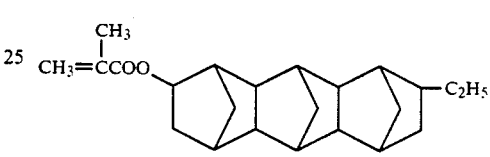

12-ethylhexacyclo
[6.6.1.1$^{3,6}$.1$^{10,13}$.0$^{2,7}$.0$^{9,14}$]
heptadecyl-4-methacrylate

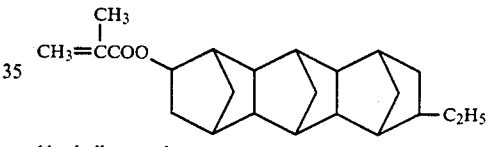

11-ethylhexacyclo
[6.6.1.1$^{3,6}$.1$^{10,13}$.0$^{2,7}$.0$^{9,14}$]
heptadecyl-4-methacrylate

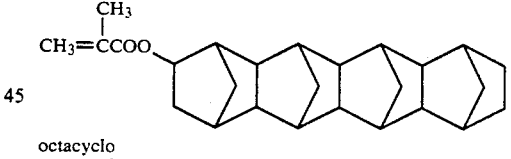

octacyclo
[8.8.0.1$^{2,9}$.1$^{4,7}$.1$^{11,18}$.1$^{13,16}$.0$^{3,8}$.0$^{12,17}$]
docosyl-5-methacrylate

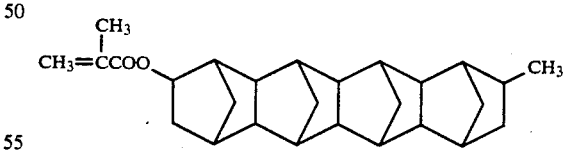

15-methyloctacyclo
[8.8.0.1$^{2,9}$.1$^{4,7}$.1$^{11,18}$.1$^{13,16}$.0$^{3,8}$.0$^{12,17}$]
docosyl-5-methacrylate

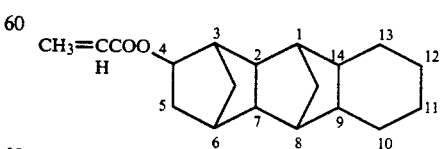

pentacyclo
[6.6.1.1$^{3,6}$.0$^{2,7}$.0$^{9,14}$]
hexadecyl-4-acrylate

-continued

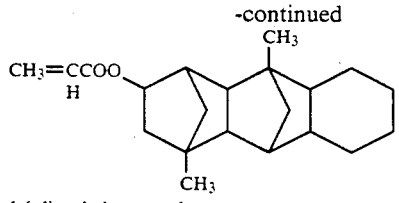

1,6-dimethylpentacyclo
[6.6.1.1$^{3,6}$.0$^{2,7}$.0$^{9,14}$]
hexadecyl-4-acrylate

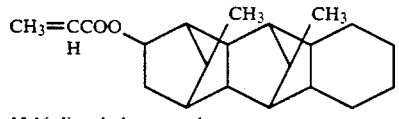

15,16-dimethylpentacyclo
[6.6.1.1$^{3,6}$.0$^{2,7}$.0$^{9,14}$]
hexadecyl-4-acrylate

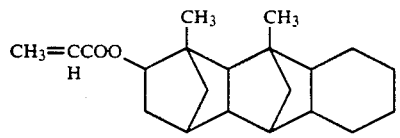

1,3-dimethylpentacyclo
[6.6.1.1$^{3,6}$.0$^{2,7}$.0$^{9,14}$]
hexadecyl-4-acrylate

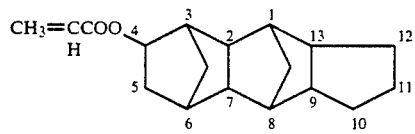

pentacyclo
[6.5.1.1$^{3,6}$.0$^{2,7}$.0$^{9,13}$]
pentadecyl-4-acrylate

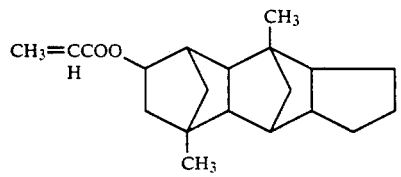

1,6-dimetylpentacyclo
[6.5.1.1$^{3,6}$.0$^{2,7}$.0$^{9,13}$]
pentadecyl-4-acrylate

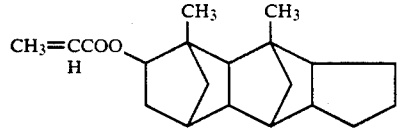

1,3-dimethylpentacyclo
[6.5.1.1$^{3,6}$.0$^{2,7}$.0$^{9,13}$]
pentadecyl-4-acrylate

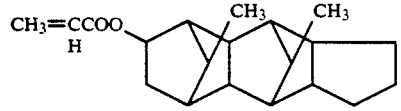

14,15-dimetylpentacyclo
[6.5.1.1$^{3,6}$.0$^{2,7}$.0$^{9,13}$]
pentadecly-4-acrylate

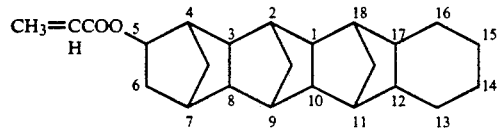

heptacyclo[8.8.0.1$^{2,9}$.
1$^{4,7}$.1$^{11,18}$.0$^{3,8}$.0$^{12,17}$]
eicosyl-5-acrylate -continued

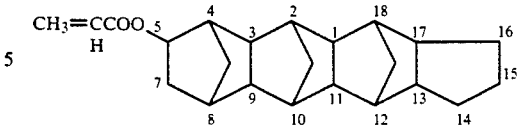

heptacyclo[8.7.0.1$^{2,9}$.
1$^{4,7}$.1$^{11,17}$.0$^{3,8}$.0$^{12,16}$]
eicosyl-5-acrylate

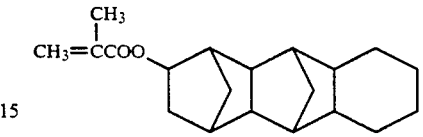

pentacyclo[6.6.1.1$^{3,6}$.0$^{2,7}$.
0$^{9,14}$]hexadecyl-4-methacrylate

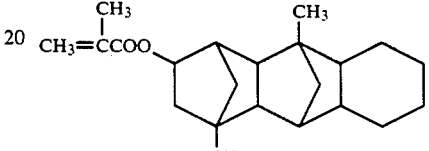

1,6-dimethylpentacyclo[6.6.1.1$^{3,6}$.
0$^{2,7}$.0$^{9,14}$]hexadecyl-4-methacrylate

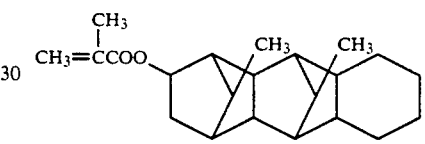

15,16-dimethylpentacyclo[6.6.1.1$^{3,6}$.
0$^{2,7}$.0$^{9,14}$]hexadecyl-4-methacrylate

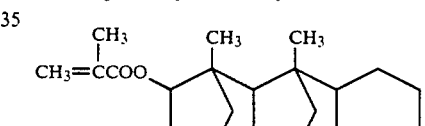

1,3-dimethylpentacyclo[6.6.1.1$^{3,6}$.
0$^{2,7}$.0$^{9,14}$]hexadecyl-4-methacrylate

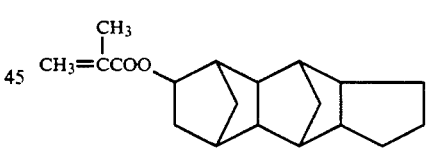

Pentacyclo[6.5.1.1$^{3,6}$.0$^{2,7}$.0$^{9,13}$]
pentadecyl-4-methacrylate

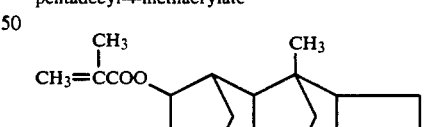

1,6-dimethylpentacyclo
[6.5.1.1$^{3,6}$.0$^{2,7}$.0$^{9,13}$]
pentadecyl-4-methacrylate

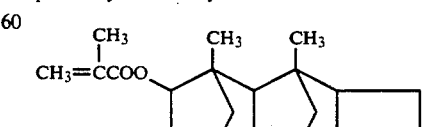

1,3-dimethylpentacyclo
[6.5.1.1$^{3,6}$.0$^{2,7}$.0$^{9,13}$]
pentadecyl-4-methacrylate -continued

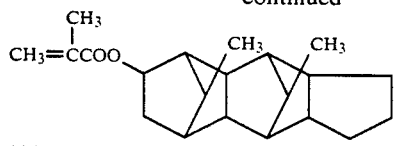

14,15-dimethylpentacyclo
[6.5.1.1³·⁶.0²·⁷.0⁹·¹³]
pentadecyl-4-methacrylate

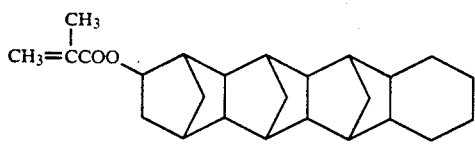

Heptacyclo[8.8.0.1²·⁹.
1⁴·⁷.1¹¹·¹⁸.0³·⁸.0¹²·¹⁷]
eicosyl-5-methacrylate

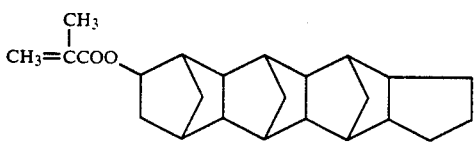

Heptacyclo[8.7.0.1²·⁹.
1⁴·⁷.1¹¹·¹⁷.0³·⁸.0¹²·¹⁶]
eicosyl-5-methacrylate

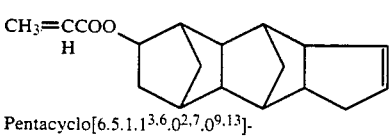

Pentacyclo[6.5.1.1³·⁶.0²·⁷.0⁹·¹³]-
11-pentadecenyl-4-acrylate

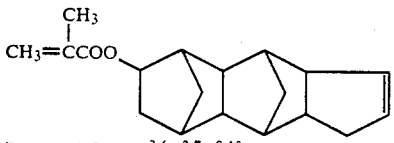

Pentacyclo[6.5.1.1³·⁶.0²·⁷.0⁹·¹³]-
11-pentadecenyl-4-methacrylate

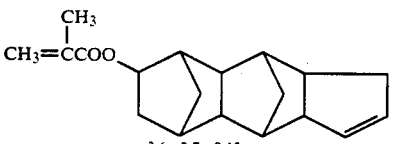

Pentacyclo[6.5.1.1³·⁶.0²·⁷.0⁹·¹³]-
10-pentadecenyl-4-methacrylate

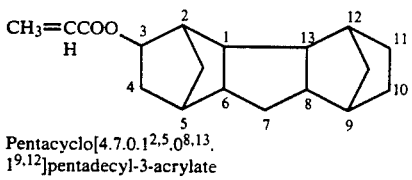

Pentacyclo[4.7.0.1²·⁵.0⁸·¹³.
1⁹·¹²]pentadecyl-3-acrylate

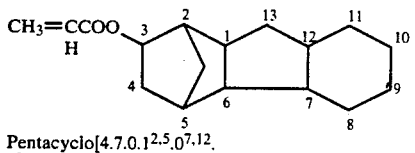

Pentacyclo[4.7.0.1²·⁵.0⁷·¹².
1⁸·¹¹]pentadecyl-3-acrylate

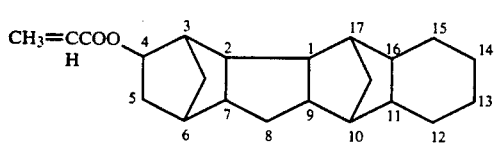

Heptacyclo[7.8.0.1³·⁶.
0²·⁷.1¹⁰·¹⁷.0¹¹·¹⁶.1¹²·¹⁵]
eicocyl-4-acrylate

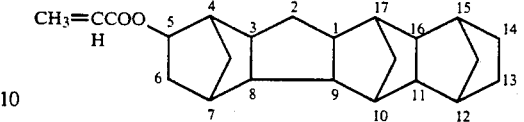

Heptacyclo[7.8.0.1⁴·⁷.
0³·⁸.1¹⁰·¹⁷.0¹¹·¹⁶.1¹²·¹⁵]
eicocyl-5-acrylate

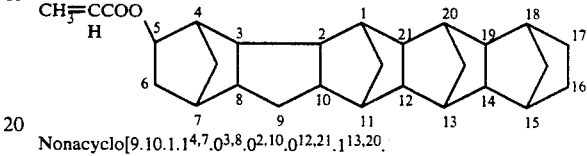

Nonacyclo[9.10.1.1⁴·⁷.0³·⁸.0²·¹⁰.0¹²·²¹.1¹³·²⁰.
0¹⁴·¹⁹.1¹⁵·¹⁸]pentacocyl-5-acrylate

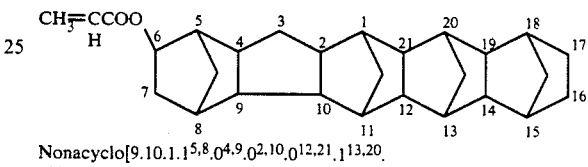

Nonacyclo[9.10.1.1⁵·⁸.0⁴·⁹.0²·¹⁰.0¹²·²¹.1¹³·²⁰.
0¹⁴·¹⁹.1¹⁵·¹⁸]pentacocyl-5-acrylate

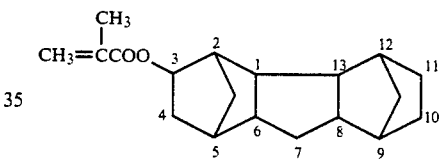

Pentacyclo[4.7.0.1²·⁵.0⁸·¹³.
1⁹·¹²]pentadecyl-3-methacrylate

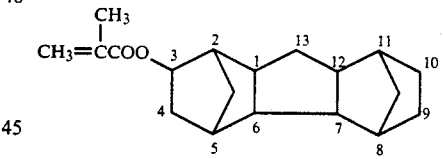

Pentacyclo[4.7.0.1²·⁵.0⁷·¹².
1⁸·¹¹]pentadecyl-3-methacrylate

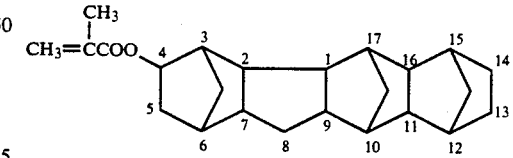

Heptacyclo[7.8.0.1³·⁶.
0²·⁷.1¹⁰·¹⁷.0¹¹·¹⁶.1¹²·¹⁵]
eicocyl-4-methacrylate

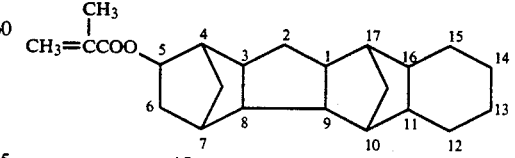

Heptacyclo[7.8.0.1⁴·⁷.
0³·⁸.1¹⁰·¹⁷.0¹¹·¹⁶.1¹²·¹⁵]
eicocyl-5-methacrylate

-continued

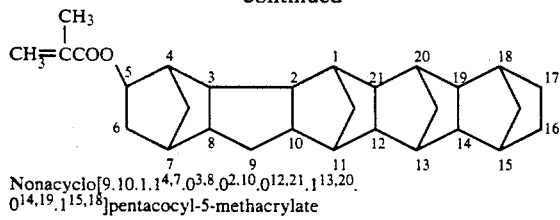

Nonacyclo[9.10.1.1$^{4,7}$.0$^{3,8}$.0$^{2,10}$.0$^{12,21}$.1$^{13,20}$.
0$^{14,19}$.1$^{15,18}$]pentacocyl-5-methacrylate

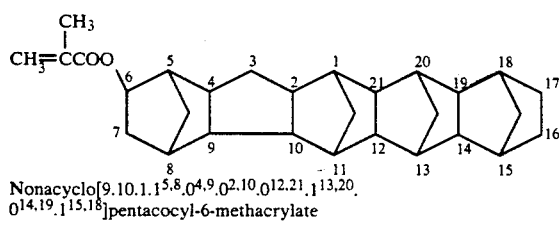

Nonacyclo[9.10.1.1$^{5,8}$.0$^{4,9}$.0$^{2,10}$.0$^{12,21}$.1$^{13,20}$.
0$^{14,19}$.1$^{15,18}$]pentacocyl-6-methacrylate The organic peroxide (D) includes, for example, benzoyl peroxide, dichlorobenzoyl peroxide, cumene hydroperoxide, dicumyl peroxide, di-tert-butyl peroxide, 2,5-dimethyl-2,5-di(peroxide benzoate)hexyne-3, 1,4-bis(tert-butylperoxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tert-buthl perbenzoate, tert-buthyl perphenyl acetate, tert-butyl perisobutylate, tert-butyl per-sec-octoate, tert-butyl perpivalate, cumyl perpivalate and tert-butyl perdiethyl acetate.

Of these peroxides as exemplified above, preferred are dialkyl peroxides such as dicumyl peroxide, di-tert-butyl peroxide, 2,5-dimethyl-2,5-di(tert-butylperoxy)-hexyne-3 and 1,4-bis(tert-butylperoxyisopropyl)benzene and 2,5-dimethyl-2,5-di(tert-butylperoxy) hexane.

The composition used as the adhesive of the present invention comprises the above-mentioned components (A), (B), (C) and (D) as essential ingredients, and contains, based on 100 parts by weight of the component (A), 1 to 10 parts by weight, preferably 2 to 5 parts by weight of the component (B), 15 to 35 parts by weight, preferably 20 to 30 parts by weight of the component (C), and 1 to 10 parts by weight, preferably 2 to 5 parts by weight of the component (D).

The above-mentioned composition used as the adhesive of the present invention does not necessarily contain a photopolymerization assistant, but it is desirable to use the photopolymerization assistant when the composition is cured by irradiation with an activation energy ray of a relatively low energy such as UV. In that case, various known photopolymerization assistants may be used, such as those forming radicals by decomposition on irradiation with UV or those forming radicals by elimination of hydrogen on irradiation with UV. Concrete examples of such photopolymerization assistants include benzoin or ether thereof such as benzoin or the ether thereof such as benzoin, benzoin methyl ether, benzoin ethyl ether, benzoin isopropyl ether, benzoin butyl ether; benzophenone compound such as p-chlorobenzophenone, p-methoxybenzophenone; benzyl compound such as benzyl, benzyl dimethyl ketal; hydroxyalkylphenyl ketone compound such as 1-(4-isopropylphenyl))-2-hydroxy-2-methyl-1-propanone, 1-phenyl-2-hydroxy-2-methyl-1-propanone, 1-(4-tert-butylphenyl))-2-hydroxy-2-methyl-1-propane.

Further, sensitizers which may be used in the present invention include hydrocarbons such as anthracene, chrysene, phenanthrene; nitro compounds such as p-dinitrobenzene, p-nitroaniline, 1,3,5-trinitrobenzene, p-nitrodiphenyl; amino compounds such as n-butylamine, di-n-butylamine, triethylamine, diethylaminoethy methacrylate, p-nitroamiline, N-acetyl-4-nitro-1-naphthylamine; phenol compounds such as phenol, 2,4-dinitrophenol, 2,4,5-torinitrophenol; kenones such as benzaldehyde, 9-anthra aldehyde, acetophenone, benzophenone, dibenzal acetone, benzil, p,p'-diaminobenzophenone, p,p'-tetramethyldiaminobenzophenone; quinones such as anthraquinone, 1,2-benzoanthraqionone, benzoquinone, 1,2-naphthoquinone, 1,4-naphthoquinone; anthrones such as anthrone, 1,9-benzoanthrone, 6-phenyl-1,9-benzoanthrone, 3-phenyl-1,9-benzoanthrone, 2-keto-3-aza-1,9-benzoanthrone, 3-methyl-1,3-diaza-1,9-benzoanthrone.

Basically, the above-mentioned adhesive compositions of the present invention are free from solvents, but may be incorporated with the solvents and further with such additives as may be used in solvent-free adhesives, such as reactive diluents, thickeners, anti-sag agents, stabilizers and plasticizers.

The information recording medium of the present invention, to be obtained by using the adhesives illustrated above, are manufactured by inserting the portions 8 of the hubs 4 into the center hole 3 of the laminated substrate discs 2a, 2b from both sides thereof, charging the above-illustrated adhesive into the spaces aformentioned and anchoring them to each other by providing U.V. ray thereto.

In the information recoring discs 1 thus manufactured, since the photo-curable compound to be cured by activating energy ray is used for the adhesive, the recording media has the adhesive portions which is cured immediately and have excellent adhesion in the beginning of curing and in humid condition.

As used in the present invention, the term information recording medium is intended to include all the media recording information in the recording layer thereof, such as optical discs and flexible optical discs.

EFFECT OF THE INVENTION

According to the first information recording medium of the present invention, since the hubs are bonded with the disc substrates at the insertion portion and the flange portion by means of the adhesive layer, the hubs themselves are bonded to each other by means of the adhesive layer and the adhesive is stored in the notches, there can be provided the information recording media having the structure easy to assemble and capable of obtaining high adhesion of the adhesive layer. Furthermore, in case that the specific photo-curable compound comprisingthe specific ingredient (A)-(D), which is cured by activating energy ray is used for the adhesive layer, there can be provided the information recording layer having the adhesive layer which is excellent in initial adhesive properties and also excellent in humidity resistant adhesive properties.

According to the second information recording medium of the present invention, the hubs are in contact firmly with the disc substrates at the insertion portion, the hubs bonded with the disc substrates at the insertion portion of each hub and are bonded to each other and the adhesive stored in the notch provided in each hubs, and further, the specific photo-curable compound comprising the specific ingredient (A)-(D), which is cured by activating energy ray is used for the adhesive, hence there can be provided the information recording media having the structure easy to assemble and capable of obtaining high adhesion of the adhesive layer and having the adhesive layer excellent in initial adhesive properties and also excellent in humidity resistant adhesive properties.

EXAMPLES

Given below are brief comments on the test examples that follow.

In these examples, the information recording medium was evaluated by comparison between the results of adhesion strength obtained before and after the moisture resistance test carried out by maintaining the information recording medium 1 for 200 hours in a thermo-hygrostat kept at 70° C. and 85% RH.

The adhesion strength obtained in the above test was determined according to the following procedure by using a test equipment (trade name of Intesco 205). That is, a rod of this test equipment, which can move perpendicularly to the surface of the information recording media, was inserted into the center hole of the hub and fixed thereto, and then the rod was allowed to move at a constant rate (20 mm/min.) so as to push the hubs, and then the maximum stress [Kgf] (which is the stress when the adhering portion is destroyed) was measured as the adhesion strength.

EXAMPLE 1

Transparent resin substrates 1a and 1b, and hub main bodies 10 were formed by injection molding into their respective desired shapes using a random copolymer (the ethylene component of 59 mol % as mesured by $^{13}$C-NMR analysis, an intrinsic viscosity $[V]$ of 0.42 dl/g, and a glass transition temperature of 136° C. of ethylene and polycycloolefin, i.e. tetracyclo[4.4.0.1$^{2.5}$.1$^{7.10}$]-3-dodecene (structural formula

hereinagter abbreviated to TCD).

The substrates 1a and 1b, and hub main bodies 10 were provided with recording layer 1c and 1d composed of Tb-Fe-Co alloy thin film, and metallic plates 11, respectively, to form disc substrates 2a and 2b, and hubs 4.

On one hand, an photo-curable composition cured by an activating energy ray as an adhesive was prepared by adding 2 parts by weight of cyclopentadienyl isopropyl-phenyl iron (II) salt (a product of Ciba-Geigy), 0.25 part by weight of anthracene (a product of Wako Junyaku K. K.) and 3.1 parts by weight of cumene hydroperoxide (a 70% product of Kayaku Noure K. K.) to 100 parts by weight of a blend of 80 parts by weight of bisphenol A type epoxy resin (EPOMIK.R 140, a product of Mitsui Petrochemical Ind. Co., Ltd.) and acrylic monomers and oligomers (ALONIX, M-5700, M-6100, M-6300 and M-8030, products of Toa Gosei Chemical Ind. Co., Ltd) of M-5700, M-6100, M-6300 and M-8030 in amounts of 7 parts by weight, 5 parts by weight, 3 parts by weight and 5 parts by weight, respectively. The composition thus prepared was irradiated for 15 seconds with ultraviolet rays at a irradiance of 160 mW/cm$^2$ to form an adhesive layer between the flange portion 9 of the bubs 4 and the above-mentioned disc substrates 2a, 2b, between the inner perioheral surface of said center hole of above mentioned disc substrate 2a, 2b and the insertion portions 8 of hubs 4, between the hubs 4, and in notches 13, whereby the information recording medium 1 as shown in FIG. 2 was obtained.

An adhesion strength of the information recording medium 1 thus obtained was determined by the above-mentioned procedure. Results obtained are shown in Table 1.

EXAMPLES 2 and 3

In the Examples 2, disc substrates 2a and 2b were prepared by using transparent resin substrates 1a and 1b formed from polycarbonate (a product sold under a trade name AD-5503 by Teijin Kasei K. K.), whereas said disc substrates were prepared by using said resin substrates formed from polymethyl pentene type polymer (a product soled under a registered trade name TPX RT18 by Mitsui petrochemical Ind. Co., Ltd.) in Example 3. Following the same procedure as described in Example 1, the information recording medium 1 was obtained in each Examples. An adhesion strength of each information recording medium 1 was determined in the same manner as in Example 1. Results obtained are shown in Table 3.

EXAMPLE 4

There were synthesized a copolymer (A) of ethylene and TCD (the ethylene content of 59 mol % as measured by $^{13}$C-NMR analysis, an intrinsic viscosity $[\eta]$ of 0.42 dl/g as measured in decaline at 135° C., and TMA of 154° C.), and a copolymer (B) of ethylene and TCD (the ethylene content of 89 mol % as measured by $^{13}$C-NMR analysis, an intrinsic viscosity $[\eta]$ of 0.44 dl/g as measured in decaline at 135° C., and TMA of 39° C.).

The information recording medium 1 was prepared by repeating Example 1 except that transparent resin substrates 1a and 1b were prepared by using a blend of the above-mentioned copolymers (A) and (B) in the (A)/(B) weight ratio of 100/1.2.

An adhesion strength of each information recording medium 1 was determined in the same manner as in Example 1. Results obtained are shown in Table 1.

EXAMPLE 5

Example 1 was repeated except that the adhesive composition was formed between the inner peripheral surface of said center hole of the above-mentioned disc substrates 2a, 2b and the insertion portions 8 of hubs 4, between the hubs 4, and in notches 13, whereby the information recording medium 1 as shown in FIG. 10 was obtained.

An adhesion strength of each information recording medium 1 was determined in the same manner as in Example 1. Results obtained are shown in Table 1.

EXAMPLES 6-7

Examples 2 and 3 was repeated except that the adhesive composition was formed between the inner peripheral surface of said center hole of the above-mentioned disc substrates 2a, 2b and the insertion portions 8 of hubs 4, between the hubs 4, and in notches 13, whereby the information recording medium 1 as shown in FIG. 10 was obtained.

An adhesion strength of each information recording medium 1 was determined in the same manner as in Example 1. Results obtained are shown in Table 1.

EXAMPLES 8

Example 4 was repeated except that the adhesive composition was formed between the inner peripheral surface of said center hole of the above-mentioned disc substrates 2a, 2b and the insertion portions 8 of hubs 4, between the hubs 4, and in notches 13, whereby the information recording medium 1 as shown in FIG. 10 was obtained.

An adhesion strength of each information recording medium 1 was determined in the same manner as in Example 1. Results obtained are shown in Table 1.

COMPARATIVE EXAMPLES 1 and 2

Example 5 was repeated except that the adhesive composition used in Comparative Example 1 contained no acrylic monomer and no oligomer, and the adhesive composition used in Comparative Example 2 contained no cumene hydroperoxide.

An adhesion strength of each information recording medium 1 was determined in the same manner as in Example 1. Results obtained are shown in Table 1.

TABLE 1

| | Adhesion Strength (kgf) | |
|---|---|---|
| | Before moisture resistance test | After moisture resistance test |
| Example 1 | >15 | 15 |
| Example 2 | >15 | 15 |
| Example 3 | >15 | 15 |
| Example 4 | >15 | 15 |
| Example 5 | 8–10 | 8–10 |
| Example 6 | 8–10 | 8–10 |
| Example 7 | 8–10 | 8–10 |
| Example 8 | 8–10 | 8–10 |
| Compar. Ex. 1 | 5 | 2 |
| Compar. Ex. 2 | 4 | 2 |

We claim:

1. An information medium comprising:
   two transparent resin substrates combined via a spacer therebetween or laminated with each other by an adhesive layer, said combined substrates having a center hole, at least one of said substrates has a recording layer provided on the inner surface thereof,
   two hubs mounted over the center hole of said substrates on both sides thereof, each hub having an insertion portion to be inserted into said center hole and a flange portion to cover a portion of a substrate in the vicinity of said center hole,
   a notch provided on the peripheral surface of said hubs, and adhesive layers formed in said notch, between said flange portion of said hubs and said substrates, between the inner peripheral surface of said center hole and the outer peripheral surface of the insertion portion of said hubs and between the hubs.

2. An information recording medium as claimed in claim 1, wherein said adhesive is a photo-curable composition comprising:
   (A) an epoxy resin,
   (B) a compound selected from the group consisting of sulfonium salts and cyclopentadienyl iron compounds,
   (C) a compound selected from the group consisting of acrylates, methacrylates and olygomers thereof, and
   (D) an organic peroxide.

3. An information recording medium as claimed in claim 1 or 2, wherein said recording medium is an optical recording medium.

4. An information recording medium as claimed in claim 1 or 2, wherein said transparent resin substrate and/or said hubs comprise
   (i) a cycloolefin random copolymer of ethylene and a cycloolefin represented by the following general formula [I], or
   (ii) a ring opening polymer resulting from ring opening polymerization of the cycloolefin monomers [I] or a hydrogenated polymer resulting from the hydrogenation of said ring opening polymer,
   each of said polymers (i) and (ii) having an intrinsic viscosity [$\eta$] of from 0.01 to 10 dl/g as measured at 135° C. in decalin, General formula

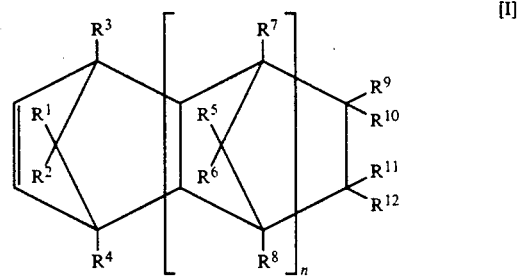

[I]

wherein $R^1$ to $R^{12}$ each represents a hydrogen atom, a halogen atom or a hydrocarbon group, and are the same or different provided that $R^9$ and $R^{10}$, or $R^{11}$ and $R^{12}$, when taken together, may form a divalent hydrocarbon group, $R^9$ or $R^{10}$ and $R^{11}$ or $R^{12}$, when taken together, may form a hydrocarbon ring, and n is 0 or a positive integer and, when n is not less than 2, a plurality of $R^5$ to $R^8$ may be the same or different.

5. An information recording medium comprising:
   two transparent resin substrates combined via a spacer therebetween or laminated with each other by an adhesive layer, said combined substrates having a center hole, at least one of said substrates has a recording layer provided on the inner surface thereof,
   two hubs mounted over the center hole of said substrates on both sides thereof, each hub having an insertion portion to be inserted into said center hole and a flange portion to cover a portion of a substrate in the vicinity of said center hole,
   a notch provided on the peripheral surface of said hubs, and
   adhesive layers formed in the notch, between the inner peripheral surface of said center hole and the outer peripheral surface of the insertion portion of said hubs and between the hubs, wherein said adhesive is a photo-curable composition comprising:
   (A) an epoxy resin,
   (B) a compound selected from the group consisting of sulfonium salts and cyclopentadienyl iron compounds,
   (C) a compound selected from the group consisting of acrylates, methacrylates and olygomers thereof, and
   (D) an organic peroxide.

6. An information recording medium as claimed in claim 5, wherein said recording medium is an optical recording medium.

7. An information recording medium as claimed in claim 6, wherein said transparent resin substrate and/or said hubs comprise
   (i) a cycloolefin random copolymer of ethylene and a cycloolefin represented by the following general formula, or
   (ii) a ring opening polymer resulting from ring opening polymerization of the cycloolefin monomers or a hydrogenated polymer resulting from the hydrogenation of said ring opening polymer,
   each of said polymers (i) and (ii) having an intrinsic viscosity [$\eta$] from 0.01 to 10 dl/g as measured at 135° C. in decalin, General formula

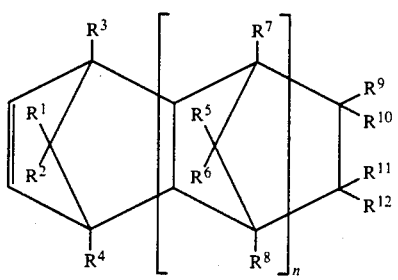

[I]

wherein $R^1$ to $R^{12}$ each represents a hydrogen atom, a halogen atom or a hydrocarbon group, and are the same or different provided that $R^9$ and $R^{10}$, or $R^{11}$ and $R^{12}$, when taken together, may form a divalent hydrocarbon group, $R^9$ or $R^{10}$ and $R^{11}$ or $R^{12}$, when taken together, may form a hydrocarbon ring, and n is 0 or a positive integer and, when n is not less than 2, a plurality of $R^5$ to $R^8$ may be the same or different.

8. An information recording disc comprising:
   two transparent resin substrates adhered together via a spacer therebetween, said disc having a center hole, at least one of said substrates has a recording layer provided on the inner surface thereof,
   two hubs mounted over the center hole of said disc, one on each side of said disc, each hub having an insertion portion to be inserted into said center hole and a flange portion to cover a portion of a substrate in the vicinity of said center hole,
   a notch provided on the peripheral surface of the insertion portion of said hubs, and
   adhesive layers formed in said notch, between said flange portion of said hubs and said substrates, between the inner peripheral surface of said center hole and the outer peripheral surface of the insertion portion of said hubs and between the hubs.

9. An information recording disc comprising:
   two transparent resin substrates adhered together via a spacer therebetween, said disc having a center hole, at least one of said substrates has a recording layer provided on the inner surface thereof,
   two hubs mounted over the center hole of said disc, one on each side of said disc, each hub having a portion to be inserted into said center hole and a flange portion to cover a portion of a substrate in the vicinity of said center hole,
   a notch provided on the peripheral surface of the insertion portion of said hubs, and
   adhesive layers formed in the notch, between the inner peripheral surface of said center hole and the outer peripheral surface of the inserted portion of said hubs and between the hubs.

* * * * *